US011938069B2

(12) United States Patent
Lacasse et al.

(10) Patent No.: US 11,938,069 B2
(45) Date of Patent: *Mar. 26, 2024

(54) SUPPORT PANEL PIVOTING SYSTEM FOR A PATIENT SUPPORT DEVICE

(71) Applicant: UMANO MEDICAL INC., L'Islet (CA)

(72) Inventors: Sylvain Lacasse, Quebec (CA); Steve Bolduc, Beaumont (CA); Jimmy Laflamme, Levis (CA); Guy Lemire, Beaumont (CA); Jean-Philippe Beaudet, L'Islet (CA); Gabriel Mercier, Saint-Vallier (CA); Esther Berthelot, Levis (CA)

(73) Assignee: UMANO MEDICAL INC., L'Islet (CA)

( * ) Notice: Subject to any disclaimer, the term of this patent is extended or adjusted under 35 U.S.C. 154(b) by 132 days.

This patent is subject to a terminal disclaimer.

(21) Appl. No.: 17/582,342

(22) Filed: Jan. 24, 2022

(65) Prior Publication Data

US 2022/0142837 A1 May 12, 2022

Related U.S. Application Data

(60) Continuation of application No. 16/512,367, filed on Jul. 15, 2019, now Pat. No. 11,229,563, which is a (Continued)

(51) Int. Cl.
*A61G 7/005* (2006.01)
*A47C 20/04* (2006.01)
(Continued)

(52) U.S. Cl.
CPC ............ *A61G 7/005* (2013.01); *A61G 7/012* (2013.01); *A61G 7/015* (2013.01); *A61G 7/018* (2013.01);
(Continued)

(58) Field of Classification Search
CPC ........... A61G 2200/16; A61G 2200/18; A61G 7/015; A61G 7/002; A61G 7/02;
(Continued)

(56) References Cited

U.S. PATENT DOCUMENTS 402,129 A * 4/1889 Beckert ................. A47C 19/04 5/183
1,330,982 A 2/1920 Goldstein
(Continued)

OTHER PUBLICATIONS

Martin, "The Trendelenburg position: a review of current slants about head down tilt." AANA Journal, 1995, Figure 5; https://www.semanticscholar.org/paper/The-Trendelenburg-position%3A-a-review-of-current-Martin/6a0a8c9b7b3bdb814864599566d6a868b09952a0.

*Primary Examiner* — Justin C Mikowski
*Assistant Examiner* — Morgan J McClure
(74) *Attorney, Agent, or Firm* — STEPTOE LLP; Scott M. Richey

(57) ABSTRACT

A backrest pivoting system can have a backrest and an actuator for pivoting the backrest. The actuator is pivotably connected to the backrest by a pivot defining a first pivot axis. The backrest can pivot about a guide member which defines a second pivot axis coaxial with the first pivot axis. A backrest pivoting system can include an actuator and a resilient member mounted in series with the actuator. There is also provided an extendable user support assembly comprising a lower body support panel and a core support panel supported by a frame, the lower body support panel being translatable relative to the frame such that an opening is created between the lower body support panel and the core support panel when the lower body support panel is translated away from the core support panel. There is also provided a method for placing a bed in a vascular position.

25 Claims, 25 Drawing Sheets

Related U.S. Application Data division of application No. 14/838,068, filed on Aug. 27, 2015, now Pat. No. 10,426,679.

(60) Provisional application No. 62/042,438, filed on Aug. 27, 2014.

(51) Int. Cl.

| | |
|---|---|
| ***A47C 20/08*** | (2006.01) |
| ***A47C 20/10*** | (2006.01) |
| ***A61G 7/012*** | (2006.01) |
| ***A61G 7/015*** | (2006.01) |
| ***A61G 7/018*** | (2006.01) |
| ***A61G 13/02*** | (2006.01) |
| ***A61G 13/04*** | (2006.01) |
| ***A61G 13/08*** | (2006.01) |

(52) U.S. Cl.

CPC .............. *A47C 20/04* (2013.01); *A47C 20/08* (2013.01); *A47C 20/10* (2013.01); *A61G 13/02* (2013.01); *A61G 13/04* (2013.01); *A61G 13/08* (2013.01); *A61G 2200/16* (2013.01); *A61G 2203/42* (2013.01)

(58) Field of Classification Search

CPC ........ A61G 7/047; A61G 7/005; A61G 7/012; A61G 7/018; A61G 13/02; A61G 13/04; A61G 13/08; A61G 2203/42; A47C 19/04; A47C 20/04; A47C 20/08; A47C 20/10

See application file for complete search history.

(56) References Cited

U.S. PATENT DOCUMENTS

| | | | | | |
|---|---|---|---|---|---|
| 1,838,898 | A | | 12/1931 | Aldeen | |
| 1,858,542 | A | | 5/1932 | Duvall | |
| 1,864,599 | A | | 6/1932 | Linder | |
| 2,291,392 | A | | 7/1942 | Krakauer | |
| 2,728,922 | A | | 1/1956 | Feinstein | |
| 3,061,843 | A | | 11/1962 | Hyman et al. | |
| 3,177,503 | A | | 4/1965 | Black et al. | |
| 3,237,212 | A | | 3/1966 | Hillenbrand | |
| 3,434,165 | A | | 3/1969 | Keane | |
| 3,644,946 | A | | 2/1972 | Swatt | |
| 3,733,623 | A | | 5/1973 | Croxton | |
| 3,840,910 | A | | 10/1974 | Damico | |
| 3,887,951 | A | | 6/1975 | Yates et al. | |
| 4,135,835 | A | * | 1/1979 | Kitchen | A47C 19/04 135/120.2 |
| 4,190,913 | A | * | 3/1980 | DiMatteo | A61G 7/02 5/83.1 |
| 4,258,445 | A | | 3/1981 | Zur | |
| 4,769,584 | A | | 9/1988 | Irigoyen | |
| 5,205,004 | A | | 4/1993 | Hayes | |
| 5,261,725 | A | | 11/1993 | Rudolph | |
| 5,423,097 | A | | 6/1995 | Brule | |
| 5,444,880 | A | | 8/1995 | Weismiller et al. | |
| 5,479,665 | A | | 1/1996 | Cassidy | |
| 5,574,339 | A | | 11/1996 | Kattwinkel | |
| 5,682,631 | A | | 11/1997 | Weismiller et al. | |
| 5,715,548 | A | * | 2/1998 | Weismiller | A61G 7/052 5/624 |
| 5,758,372 | A | * | 6/1998 | Lopez Diaz | A47C 19/045 5/200.1 |
| 5,782,869 | A | | 7/1998 | Berdut | |
| 5,890,238 | A | | 4/1999 | Votel | |
| 5,898,961 | A | | 5/1999 | Ambach et al. | |
| 5,906,017 | A | | 5/1999 | Ferrand et al. | |
| 6,000,076 | A | * | 12/1999 | Webster | A61G 7/0524 5/616 |
| 6,173,461 | B1 | | 1/2001 | Alexander | |
| 6,249,695 | B1 | | 6/2001 | Damadian | |
| 6,336,235 | B1 | | 1/2002 | Ruehl | |
| 6,341,393 | B1 | | 1/2002 | Votel | |
| 6,351,861 | B1 | | 3/2002 | Shows et al. | |
| 6,353,950 | B1 | | 3/2002 | Bartlett | |
| 6,363,556 | B1 | | 4/2002 | Krauska | |
| 6,378,148 | B1 | | 4/2002 | Votel | |
| 6,405,393 | B2 | | 6/2002 | Megown | |
| 6,496,993 | B2 | | 12/2002 | Allen et al. | |
| 6,539,566 | B1 | | 4/2003 | Hayes | |
| 6,611,979 | B2 | | 9/2003 | Welling | |
| 6,640,360 | B2 | | 11/2003 | Hornbach et al. | |
| 6,651,279 | B1 | | 11/2003 | Muthuvelan | |
| 6,651,281 | B1 | | 11/2003 | Figiel | |
| 6,684,427 | B2 | | 2/2004 | Allen et al. | |
| 6,836,912 | B1 | * | 1/2005 | Morris | A47C 19/04 5/183 |
| 6,968,584 | B1 | | 11/2005 | Laflèche | |
| 7,017,208 | B2 | | 3/2006 | Weismiller | |
| 7,036,166 | B2 | | 5/2006 | Kramer | |
| 7,040,585 | B2 | | 5/2006 | Cheng | |
| 7,055,195 | B2 | | 6/2006 | Roussy | |
| 7,296,312 | B2 | | 11/2007 | Menkedick et al. | |
| 7,441,291 | B2 | | 10/2008 | Hayes et al. | |
| 7,610,637 | B2 | | 11/2009 | Menkedick | |
| 7,634,826 | B2 | | 12/2009 | Koch | |
| 7,676,866 | B2 | | 3/2010 | Toms | |
| 7,716,762 | B2 | | 5/2010 | Ferraresi et al. | |
| 7,779,494 | B2 | | 8/2010 | Poulos et al. | |
| 7,805,784 | B2 | | 10/2010 | Lemire et al. | |
| 7,836,531 | B2 | | 11/2010 | Girard | |
| 7,849,539 | B2 | | 12/2010 | Hornbach et al. | |
| 7,978,084 | B2 | | 7/2011 | Dixon | |
| 8,051,513 | B2 | | 11/2011 | Reed | |
| RE43,193 | E | | 2/2012 | Osborne | |
| 8,516,634 | B2 | | 8/2013 | Turner et al. | |
| 8,555,438 | B2 | | 10/2013 | Turner et al. | |
| 8,677,536 | B2 | | 3/2014 | Douglas | |
| 8,746,710 | B2 | | 6/2014 | Schejbal | |
| 8,806,682 | B2 | * | 8/2014 | Hornbach | A61G 7/018 5/619 |
| 8,984,685 | B2 | | 3/2015 | Robertson | |
| 9,038,218 | B1 | | 5/2015 | Heil et al. | |
| 9,107,783 | B2 | | 8/2015 | Childs | |
| 9,144,527 | B2 | | 9/2015 | Reinke | |
| 9,149,403 | B2 | * | 10/2015 | Turner | A61G 7/16 |
| 9,295,598 | B2 | | 3/2016 | Roussy et al. | |
| 9,314,385 | B2 | | 4/2016 | Jutras | |
| 9,801,770 | B2 | | 10/2017 | Edavana | |
| 9,833,368 | B2 | | 12/2017 | Turner | |
| 9,855,176 | B2 | | 1/2018 | Roussy | |
| 9,956,127 | B2 | | 5/2018 | Turner et al. | |
| 10,071,005 | B2 | | 9/2018 | Roussy | |
| 10,130,536 | B2 | | 11/2018 | Roussy | |
| 10,188,569 | B2 | | 1/2019 | Elku | |
| 10,238,566 | B2 | | 3/2019 | Heimbrock | |
| 10,413,465 | B2 | | 9/2019 | Zerhusen et al. | |
| 10,425,579 | B2 | | 10/2019 | Lacasse | |
| 10,426,679 | B2 | | 10/2019 | Lacasse | |
| 2001/0032362 | A1 | * | 10/2001 | Welling | A61G 7/0528 5/600 |
| 2002/0059679 | A1 | | 5/2002 | Weismiller et al. | |
| 2002/0144348 | A1 | | 10/2002 | Ganance | |
| 2002/0148044 | A1 | | 10/2002 | Hayes et al. | |
| 2002/0174486 | A1 | | 11/2002 | Heuvel et al. | |
| 2002/0174487 | A1 | | 11/2002 | Kramer | |
| 2003/0088920 | A1 | | 5/2003 | Allen et al. | |
| 2004/0187213 | A1 | | 9/2004 | Wang | |
| 2005/0125900 | A1 | | 6/2005 | Bishop et al. | |
| 2005/0172405 | A1 | | 8/2005 | Menkedick et al. | |
| 2005/0283914 | A1 | | 12/2005 | Roussy | |
| 2006/0010601 | A1 | | 1/2006 | Riley et al. | |
| 2006/0021143 | A1 | | 2/2006 | Lemire | |
| 2006/0021145 | A1 | | 2/2006 | Hornbach | |
| 2006/0059621 | A1 | | 3/2006 | Poulos et al. | |
| 2006/0059624 | A1 | | 3/2006 | Poulos et al. | |
| 2006/0085914 | A1 | * | 4/2006 | Peterson | A61G 7/053 5/430 |
| 2007/0107124 | A1 | | 5/2007 | Koch | |
| 2007/0157385 | A1 | | 7/2007 | Lemire | |

(56) References Cited

U.S. PATENT DOCUMENTS

2007/0169267 A1* 7/2007 Paz ........................ A61G 7/053 5/618
2007/0174965 A1 8/2007 Lemire
2008/0172789 A1 7/2008 Elliot
2008/0189856 A1 8/2008 Toms
2008/0276369 A1 11/2008 Hayes et al.
2008/0289108 A1 11/2008 Menkedick et al.
2009/0031498 A1 2/2009 Girard et al.
2009/0055216 A1 2/2009 Inaba
2009/0165208 A1 7/2009 Reed
2010/0011505 A1 1/2010 Horitani
2010/0122415 A1 5/2010 Turner et al.
2010/0212087 A1 8/2010 Leib
2011/0083272 A1 4/2011 Childs et al.
2011/0197361 A1 8/2011 Hornbach et al.
2011/0258780 A1 10/2011 O'Keefe
2011/0277241 A1 11/2011 Schejbal
2012/0005832 A1 1/2012 Turner et al.
2012/0109027 A1 5/2012 Gozelski, Jr. et al.
2012/0117730 A1 5/2012 Lemire
2012/0137436 A1 6/2012 Andrienko
2012/0144588 A1 6/2012 Heimbrock
2012/0151678 A1 6/2012 Richards
2012/0259245 A1 10/2012 Receveur
2013/0055502 A1* 3/2013 Kay ....................... A61G 7/005 5/618
2013/0086746 A1 4/2013 Vanderpohl
2013/0145550 A1 6/2013 Roussy et al.
2013/0150219 A1 6/2013 Chang
2013/0152308 A1 6/2013 Valdemoros Tobia et al.
2013/0205501 A1* 8/2013 Robertson .............. A61G 7/015 5/617
2013/0227787 A1* 9/2013 Herbst ................. A61G 7/1067 5/618
2013/0318720 A1 12/2013 Connell et al.
2013/0333115 A1 12/2013 Reinke
2014/0013512 A1 1/2014 Turner et al.
2014/0075674 A1* 3/2014 Chun ..................... A61G 7/015 5/617
2014/0115785 A1 5/2014 Turner
2014/0197654 A1* 7/2014 Valentino ............... A61G 1/013 296/20
2014/0259413 A1 9/2014 Johnson et al.
2014/0259420 A1* 9/2014 Lambarth ............ A61G 1/0567 5/618
2014/0310876 A1 10/2014 Roussy et al.
2015/0096815 A1* 4/2015 Ottenweller ......... A61G 7/0528 180/19.1
2015/0128347 A1* 5/2015 Hutchison .............. A61G 7/018 5/616
2015/0135431 A1 5/2015 Dindas et al.
2015/0135439 A1 5/2015 Sammons
2015/0135440 A1 5/2015 Chiacchira et al.
2015/0164722 A1 6/2015 Roussy et al.
2015/0328074 A1 11/2015 Edavana et al.
2015/0335508 A1 11/2015 Liu
2015/0366730 A1 12/2015 Pearson
2016/0058639 A1 3/2016 Lacasse
2016/0120327 A1 5/2016 Shimada
2016/0193095 A1 7/2016 Roussy et al.
2016/0287454 A1* 10/2016 Magill ................. A61G 1/0262
2016/0302985 A1 10/2016 Tessmer et al.
2018/0000674 A1* 1/2018 Bartley ................ A61G 7/0516
2018/0344551 A1 12/2018 Huang
2019/0059601 A1* 2/2019 Kramer ................ A47C 19/045
2019/0336363 A1 11/2019 Lacasse et al.
2019/0336368 A1 11/2019 Zerhusen et al.

* cited by examiner

SUPPORT PANEL PIVOTING SYSTEM FOR A PATIENT SUPPORT DEVICE

CROSS REFERENCE TO RELATED APPLICATIONS

The application is a continuation application of U.S. application Ser. No. 16/512,367 filed on Jul. 15, 2019 (now U.S. Pat. No. 11,229,563), which is a divisional application of U.S. application Ser. No. 14/838,068 filed on Aug. 27, 2015 (now U.S. Pat. No. 10,426,679), claiming priority upon provisional U.S. Application 62/042,438 filed on Aug. 27, 2014, which are incorporated herein by reference.

FIELD

The present invention relates to patient support apparatuses such as hospital beds. In particular, the invention relates to patient support apparatuses with improved sleep surface characteristics, such as systems for orienting the sections of the patient support surface.

BACKGROUND

Patient support apparatuses, such as hospital beds often allow rotation of patient support surfaces in different positions to achieve a plurality of configurations for the bed. Many hospital beds have an elevation system which can raise and lower the frame of the patient support surface. Often, these elevation systems are electrically powered. Examples of configurations for the bed include a lying (sleeping) position, a vascular position with the legs of the patient being maintained horizontal and a raised (sitting) position.

Cardiopulmonary resuscitation (CPR) is an emergency procedure performed to restore spontaneous blood circulation and breathing in a person who is in cardiac arrest. It is indicated for those who are unresponsive with no breathing or abnormal breathing. Cardiac arrest is a medical emergency that is potentially reversible if treated early. Unexpected cardiac arrest can lead to death within minutes. A CPR handle is typically provided on hospital beds to speed up the process of lowering the head section and flattening all sleep surface sections to allow medical personnel to begin CPR procedures. This is especially useful if the head section of the bed is in the fully raised configuration.

The movements of the sections of hospital beds are usually slow so as not to disturb the patient. Rising and lowering the head section typically take 25 to 35 seconds, and noise and jolts are avoided to the extent possible. In an emergency situation, time is of the essence. It is therefore acceptable to lower the head section in 5 seconds in that situation.

Some actuators available on the market are disengageable. When gears are disengaged, the time of descent with a heavy patient is less than 2 seconds. This is considered too rapid according to medical personnel who fear discomfort or injury for themselves or the patient. Furthermore, safety regulations require that all movement be attended, meaning that medical personnel has to hold a handle during the process, letting go would stop the displacement right away. The actuator is therefore often mounted in parallel or in series with a damper. The combined system slows down the emergency descent to a 5 second duration. A gas spring can further assist the actuator by reducing the effort required by the actuator for rising the head section with a patient present on the bed.

In the event that the CPR handle is released before the head section is fully horizontal and resting on the frame, there is a considerable effort transmitted to the actuator gears. As a result, the gears can get stripped, the shaft can break and the actuator may need to be replaced. If this occurs, the patient would then need to be transferred to another bed.

Some dampers have an integrated spring which can act as a two-step force to reduce speed when almost compressed. The major drawback of this solution is that the actuator has to pull its way in to its minimum length. Most of the actuators have half the force in pull compared to push action. Depending on the strength of the spring, this action may deteriorate the actuator in the long run.

Medical staff sometimes need to place a patient in the vascular position to help with blood circulation. The vascular position of the bed frame is obtained by orienting the patient support assembly such that the legs of the patient will be vertically higher or at the same level than the patient's heart. The foot rest is parallel to the ground in this position. This is typically achieved by raising the thigh section first which is usually power activated. The foot end of the bed is then manually raised by the medical staff using a pop rod which rises the foot rest upwards. The thigh section is usually power activated to raise it to an angle while pushing the thigh rest towards the upper body of the patient. The headrest of the bed is typically lowered afterwards to reduce the vertical height of the patient's heart and achieve a full vascular position.

Because the pop rod is manually operated, the patient can experience jolts. Furthermore, there is a risk of injury to the medical staff during the manual operation. Finally, the process has two manual steps which tend to take some time. This tends to delay placement of the patient in the appropriate position. Often, medical personnel do not want to use a manual system that requires forcing against the patient weight. Furthermore, the system is usually hidden under the sleep surface foot section and is sometimes unknown to them.

When a patient is taller than average, the bed can be extended to accommodate his height. There are several ways to extend a bed to accommodate a taller patient. In some prior art beds, the footboard is removed and an added accessory is attached at the location freed by the removal of the footboard. The footboard is sometimes stored but can alternatively be re-attached to the added extension to continue use of the controls on the user interface. Some prior art systems lengthen the frame and add a pad to level the extended surface with the mattress top. When the sleep surface is angled or raised in a vascular position, the bolster remains on the frame. In other prior art beds, the extension is part of the foot section of the bed. It may be manually or power mechanically extended. Usually, the extension is stored above or under the lower body surface and is pulled away from the upper body surface in use, the lower body surface and the extension at least partially overlapping in the retracted position. The footboard is typically provided on the extension.

Medical staff sometimes need to pull back the patient towards the head end of the bed after having raised the upper body surface of the bed from the flat lying position to a raised seated position. This is caused by the movement of the patient towards the foot of the bed during rotation. This can cause injuries in medical personnel and discomfort for the patient.

Example prior art hospital beds are described in US Patent Application Publication Nos. US 20140115785, US 20130145550, US 20130333115, US 20140013512, US 20100122415, US 20120005832 and in U.S. Pat. Nos. 7,441,291, 6,496,993, 6,968,584, 6,336,235, 5,682,631, 5,906,017, 6,640,360, 7,849,539, 8,555,438.

SUMMARY

According to one aspect, there is provided a backrest pivoting system for a bed, the bed having a backrest and a frame for supporting the backrest, the backrest pivoting system comprising: an actuator having a first actuator end connected to the frame and a second actuator end pivotably connected to the backrest via a pivot defining a first pivot axis for selectively moving the pivot towards and away from the first actuator end when the actuator is actuated; at least one guide rail secured to the frame; at least one guide member operatively connected to the backrest, the at least one guide member engaging the at least one guide rail for guiding the backrest along a predetermined path during actuation of the actuator; at least one pivoting link having a first end pivotably connected to the frame and a second end pivotably connected to the backrest for pivoting the backrest relative to the frame about the at least one guide member during movement of the pivot towards and away from the first actuator end, the at least one guide member defining a second pivot axis coaxial with the first pivot axis.

In one embodiment, the at least one guide rail is angled relative to the frame to guide the backrest upwardly and away from the first end of the actuator when the backrest is pivoted away from the frame.

In one embodiment, the backrest pivoting system further comprises spaced-apart first and second lever members and a transversal member extending between the first and second lever members.

In one embodiment, each lever member comprises a first linear portion and a second linear portion angled relative to the first linear portion.

In one embodiment, the first pivot comprises a pivot bracket depending from the transversal member and a pivot pin extending through the pivot bracket and the second end of the actuator.

In one embodiment, each one of the at least one pivot member comprises a roller member adapted for rotating about the second pivot axis.

In one embodiment, the backrest pivoting system further comprises an orientation sensor operatively connected to the backrest for monitoring the orientation of the backrest relative to the frame.

In one embodiment, the orientation sensor comprises a potentiometer, a first sensor arm pivotably connected to one of the at least one guide arm and a second sensor arm pivotably connected to the first sensor arm and to the potentiometer.

In one embodiment, the backrest pivoting system further comprises a resilient member connected in series with the actuator between the frame and the actuator.

According to another aspect, there is also provided a backrest pivoting system for a bed, the bed having a frame and a backrest pivotably connected to the frame, the backrest pivoting system comprising: an actuator having a first actuator portion connected to the frame and a second actuator portion connected to the backrest for pivoting the backrest relative to the frame, the actuator further having a transmission adapted for operatively coupling the second actuator portion to the first actuator portion; a release operatively connected to the transmission, the release being movable between a locked position in which the first actuator portion is coupled to the second actuator portion and an unlocked position in which the second actuator portion is decoupled from the first actuator portion to allow free pivoting of the backrest towards the frame; a resilient member connected in series with the actuator between the frame and the actuator, the resilient member being compressible when the release is moved from the unlocked position into the locked position as the backrest pivots towards the frame.

In one embodiment, the backrest pivoting system further comprises a damper connected in parallel to the actuator, the damper being configured to provide damping during the pivoting of the backrest towards the frame.

In one embodiment, the actuator is a linear actuator.

In one embodiment, the resilient member comprises a helical spring.

In one embodiment, the backrest pivoting system further comprises a housing secured to the frame for housing the resilient member.

In one embodiment, the first actuator portion is pivotably connected to the housing.

In one embodiment, the backrest pivoting system further comprises an actuator pivot pin extending transversely through the housing and the first actuator portion, the housing comprising at least one opening for receiving the actuator pivot pin.

In one embodiment, the at least one opening is elongated to allow the actuator pivot pin to move relative to the housing when the resilient member is compressed.

According to yet another aspect, there is also provided an extendable support assembly for a bed comprising: a frame; a core support panel supported by the frame; a lower body support panel supported by the frame, the lower body surface being located adjacent the core support panel, the lower body support panel being translatable along the frame away from the core support panel to form an opening between the lower body support panel and the core support panel.

In one embodiment, the extendable support assembly further comprises an extension member having a first end pivotably connected to the core support panel and a second end telescopically engaging the lower body support panel.

According to yet another aspect, there is also provided a support panel pivoting system for a bed, said bed having a frame, a backrest pivotably connected to the frame and a lower body support panel pivotably connected to the frame, the support panel pivoting system comprising: a backrest actuator having a first actuator portion connected to the frame and a second actuator portion connected to the backrest for pivoting the backrest relative to the frame, the backrest actuator further having a transmission adapted for operatively coupling the second actuator portion to the first actuator portion; a release operatively connected to said transmission, the release being movable between a locked position in which the first actuator portion is coupled to the second actuator portion and an unlocked position in which the second actuator portion is decoupled from the first actuator portion to allow free pivoting of the backrest towards the frame; a sensor for determining that the release is in the unlocked position; a lower body actuator operatively connecting the lower body support panel to the frame for pivoting the lower body support panel relative to the frame, the lower body actuator being further operatively connected to the sensor for pivoting the backrest towards the frame when the release is in the unlocked position and that the backrest is pivoted downwardly.

In one embodiment, the sensor is operatively connected to the backrest.

In one embodiment, the sensor comprises an orientation sensor for determining an orientation of the backrest.

In one embodiment, the system comprises a control unit operatively connected to the orientation sensor for determining a pivoting speed of the backrest based on the orientation of the backrest.

In one embodiment, the control unit is further configured for determining that the release is in the unlocked position when the pivoting speed of the backrest is above a threshold speed value.

In one embodiment, the threshold speed value is 8 degrees per second.

In one embodiment, the control unit is further configured for determining that the backrest is being pivoted downwardly towards the frame.

In one embodiment, the control unit is further operatively connected to the lower body actuator for actuating the lower body actuator upon a determination that the pivoting speed of the backrest is above the threshold speed value and that the backrest is being pivoted towards the frame.

According to yet another aspect, there is also provided a method for placing a bed in a vascular position, the bed having a patient support assembly mounted onto a frame having a head end and a foot end, the patient support assembly including a backrest located near the head end, a lower body surface located near the foot end and a core body surface located between the backrest and the lower body surface, the core body surface being pivotably interconnected to the lower body surface, the method comprising: receiving a command to place the bed in the vascular position; pivoting the core support panel at a thigh angle above the frame; pivoting the lower body support panel at a lower body angle above the frame; pivoting the backrest at a back angle above the frame; tilting the frame at a tilt angle relative to the horizontal such that the head end of the frame is located below the horizontal, said pivot angle being within a predetermined range of said foot angle, thereby placing the bed in the vascular position.

According to a broad aspect, there is provided a bed for a patient, comprising: a patient platform comprising a backrest for supporting a patient's head and a patient's back region, a core body panel for supporting at least partially a patient's hip region and patient's legs, and a lower body panel for supporting the patient's legs; a frame, the patient platform being mounted to the frame; a base frame, the frame being mounted to the base frame; a backrest actuator for pivoting the backrest relative to the frame; an orientation sensor for determining an orientation of the backrest relative to the frame; a control unit connected to the orientation sensor for determining a pivoting speed of the backrest based on the orientation of the backrest; and a lower body actuator for pivoting the lower body panel or the core body panel relative to the frame, wherein, upon a determination that the pivoting speed of the backrest is above a threshold speed value and that the backrest is pivotable towards the frame, the control unit actuates the lower body actuator.

According to another broad aspect, there is provided a bed for a patient, comprising: a patient platform comprising a backrest for supporting a patient's head and a patient's back region, a core body panel for supporting at least partially a patient's hip region and patient's legs, and a lower body panel for supporting the patient's legs; a frame, the patient platform being mounted to the frame; a base frame, the frame being mounted to the base frame; a backrest actuator comprising a first actuator portion mounted to the frame and a second actuator portion mounted to the backrest for pivoting the backrest relative to the frame; a release that is movable between a locked position, wherein the first actuator portion is coupled to the second actuator portion, and an unlocked position, wherein the second actuator portion is decoupled from the first actuator portion to allow free pivoting of the backrest towards the frame; an orientation sensor for determining an orientation of the backrest relative to the frame; a control unit connected to the orientation sensor for determining a pivoting speed of the backrest based on the orientation of the backrest; and a lower body actuator for pivoting the lower body panel or the core body panel relative to the frame, wherein, when the release is in the unlocked position, and upon a determination that the pivoting speed of the backrest is above a threshold speed value, the control unit actuates the lower body actuator.

According to a further broad aspect, there is provided a bed for a patient, comprising: a patient platform comprising a backrest for supporting a patient's head and a patient's back region, a core body panel comprising first and second panels, the first panel being for supporting at least partially a patient's hip region and the second panel being for supporting at least partially the patient's hip region and patient's legs, the second panel comprising upper and lower ends, and a lower body panel for supporting the patient's legs, the lower body panel comprising upper and lower ends, wherein the lower end of the second panel is pivotably connected to the upper end of the lower body panel at a hinge connection; a frame, the patient platform being mounted to the frame; a base frame, the frame being mounted to the base frame; a backrest actuator for pivoting the backrest relative to the frame; a release that is movable between a locked position and an unlocked position; an orientation sensor for determining an orientation of the backrest relative to the frame; a control unit connected to the orientation sensor for determining a pivoting speed of the backrest based on the orientation of the backrest; and a lower body actuator for pivoting the lower body panel or the second panel relative to each other, wherein the lower body actuator comprises a lower end pivotably mounted at a lower body transverse member of the frame and an upper end pivotably connected to the hinge connection, wherein, when the release is in the unlocked position and upon a determination that the pivoting speed of the backrest is above a threshold speed value, the control unit actuates the lower body actuator.

In one embodiment, pivoting the core support panel comprises raising a rear end of the core support panel located towards the lower body support panel.

In one embodiment, raising the rear end of the core support panel further comprises raising a front end of the lower body panel located towards the core support panel, the rear end of the core support panel being hingeably connected to the front end of the lower body panel via a hinge connection.

In one embodiment, raising the rear end of the core support panel and raising the front end of the lower body panel comprising actuating a lower body actuator having a first end pivotably connected to the frame and a second end pivotably connected to the hinge connection.

In one embodiment, the tilting of the frame is performed after the raising of the core body support panel and the raising of the backrest.

In one embodiment, the raising of the core body support panel, the raising of the backrest and the tilting of the frame are performed simultaneously.

In one embodiment, the core angle is 30 degrees, the lower body angle is 13 degrees, the back angle is 13 degrees and the tilt angle is 13 degrees.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION OF EMBODIMENTS

Figure 1:
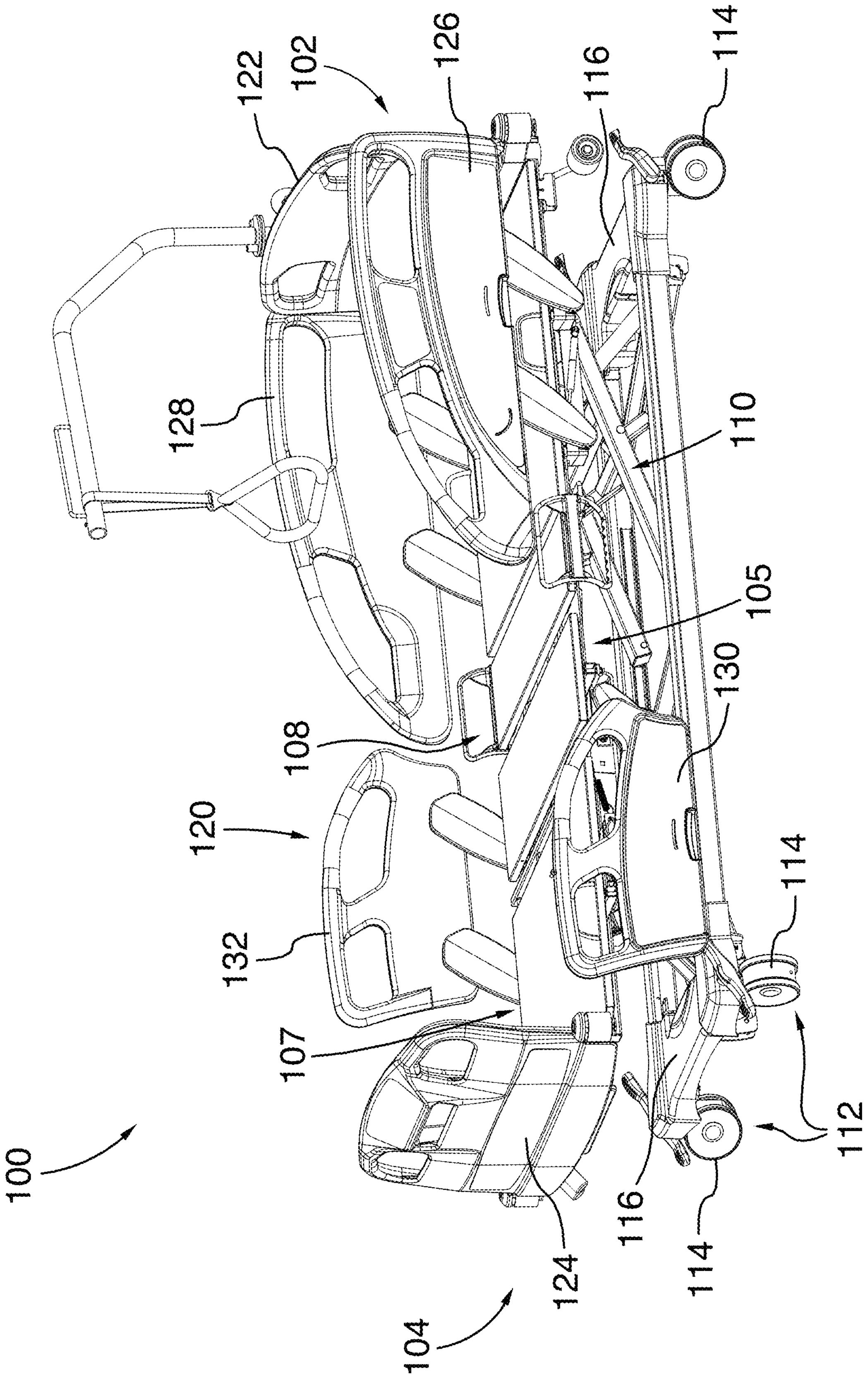
FIG. 1 is a top perspective view of a hospital bed, in accordance with one embodiment.

Variants, examples, and preferred embodiments of the invention are described hereinbelow. Referring first to FIGS. 1 to 5, there is shown a hospital bed 100, in accordance with one embodiment. The bed 100 comprises a head end 102, an opposite foot end 104 and spaced-apart left and right sides 105, 107 extending between the head end 102 and the foot end 104.

Some of the structural components of the bed 100 will be designated hereinafter as "right", "left", "head" and "foot" from the reference point of an individual lying on the individual's back on the support surface of the mattress provided on the bed 100 with the individual's head oriented toward the head end 102 of the bed 100 and the individual's feet oriented toward the foot end 104 of the bed 100.

The bed 100 includes a base 106, a patient support assembly 108 and an elevation system 110 operatively coupling the patient support assembly 108 to the base 106. In the illustrated embodiment, the base 106 is provided with a displacement assembly 112 which includes casters 114 connected to the base 106 by pivots (not shown) hidden from view by covers 116. This displacement assembly 112 allows the bed 100 to be moved and maneuvered along a floor. In one embodiment, the base is at a distance of 5 inches from the floor. Alternatively, the base could be higher or lower than 5 inches from the floor.

The elevation system 110 is configured to raise and lower the patient support assembly 108 relative to the base 106 between a minimum or fully lowered position and a maximum or fully raised position. In one embodiment, the elevation system 110 is further configured to allow the patient support assembly 108 to be set at any intermediate position between the fully lowered and fully raised positions. The elevation system 110 may further be configured to tilt the patient support assembly 108 in various orientations, as will be further explained below.

Still referring to FIG. 1, the bed 100 further includes a patient support barrier system 120 generally disposed around the patient support assembly 108. The barrier system 120 includes a plurality of barriers which extend generally vertically around the patient support assembly 108. In the illustrated embodiment, the plurality of barriers includes a headboard 122 located at the head end 102 and a footboard 124 disposed generally parallel to the headboard 122 and located at the foot end 104 of the bed 100. The plurality of barriers further include spaced-apart left and right head siderails 126, 128 which are located adjacent the headboard 122 and spaced-apart left and right foot siderails 130, 132 which are respectively located between the left and right head siderails 126, 128 and the foot end 104 of the bed 100. Each one of the plurality of barriers is moveable between an extended or raised position for preventing the patient lying on the bed 100 from moving laterally out of the bed 100, and a retracted or lowered position for allowing the patient to move or be moved laterally out of the bed 100.

The bed 100 further includes a control interface (not shown) for controlling features of the bed 100. The control interface could be integrated into the footboard 124, into the headboard 122 or into one or more of the siderails 126, 128, 130, 132. Alternatively, the control interface could be provided as a separate unit located near the bed 100 or even at a location remote from the bed 100. In one embodiment, the control interface is operatively connected to the elevation system 110 to control the height of the patient support assembly 108 above the floor.

Figure 2:
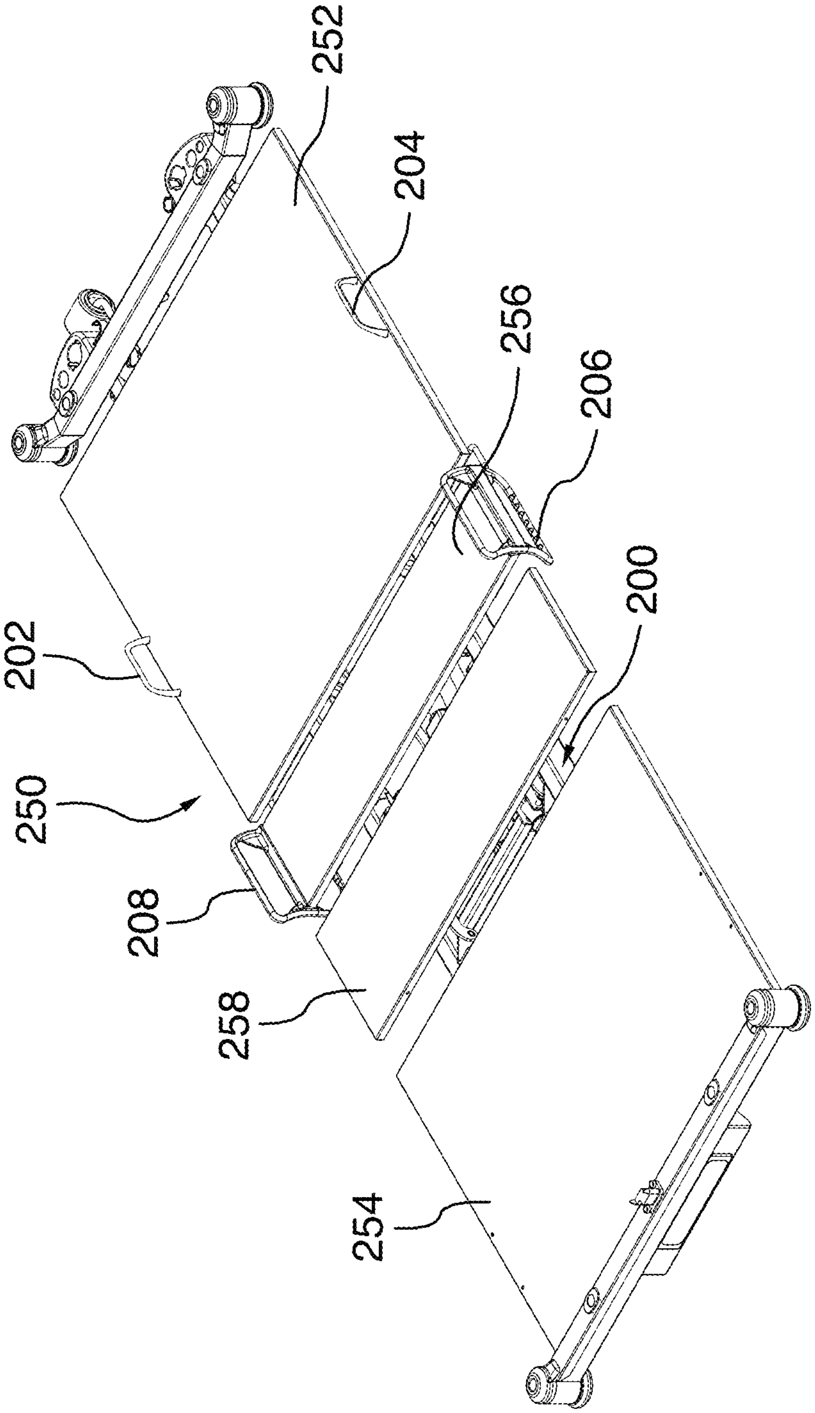
FIG. 2 is an isolated, top perspective view of a patient support assembly for the hospital bed illustrated in FIG. 1.
Figure 3:
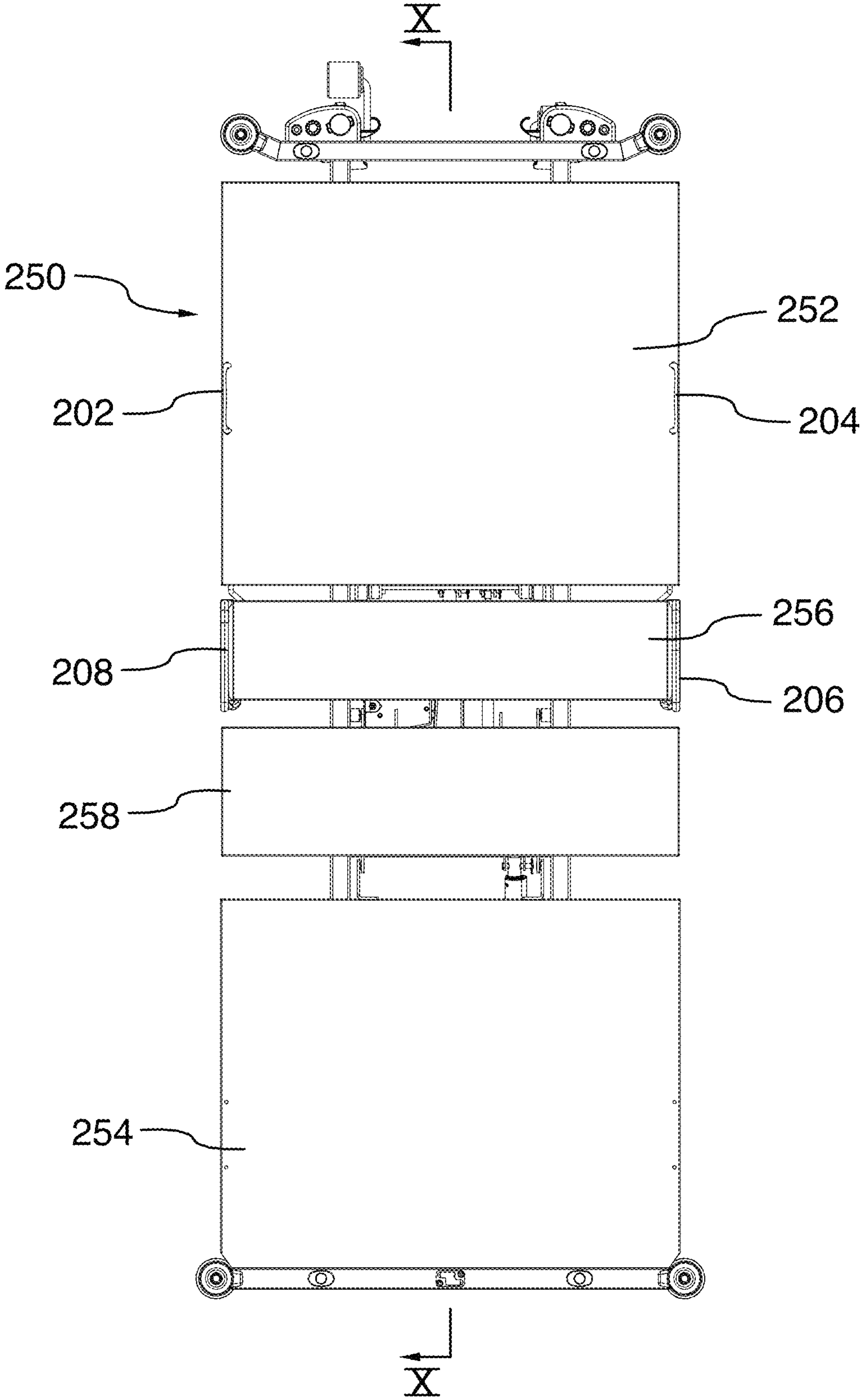
FIG. 3 is a top plan view of the patient support assembly illustrated in FIG. 2.

Now referring to FIGS. 2 and 3, the patient support assembly 108 includes a frame 200 (best shown in FIG. 4) and a patient support surface 250 supported by the frame 200. In the illustrated embodiment, the patient support surface 250 includes an upper body surface or backrest 252, a lower body surface or lower body support panel 254 and one or more core body surfaces or core support panels 256, 258 located between the backrest 252 and the lower body support panel 254 for supporting the seat and/or thighs of the patient. In the illustrated embodiment, each one of the backrest 252, the lower body support panel 254 and the core support panels 256, 258 can be angled relative to the other surfaces.

A lying surface such as a mattress or the like, not shown, is typically provided on the patient support surface 250 for receiving the patient thereon. Each one of the backrest 252 and the lower body support panel 254 can include a right loop 202 and a left loop 204 which extend above the patient support surface 250 to retain the mattress onto the patient support surface 250. The right and left loops 202, 204 can also be used for hooking on accessories (not shown) used for patient treatment to the bed 100. In the illustrated embodiment, the core support panel 256 further includes a left retainer 206 and a right retainer 208 which can also be used for retaining the mattress onto the patient support surface 250 and for hooking on accessories.

Figure 4:
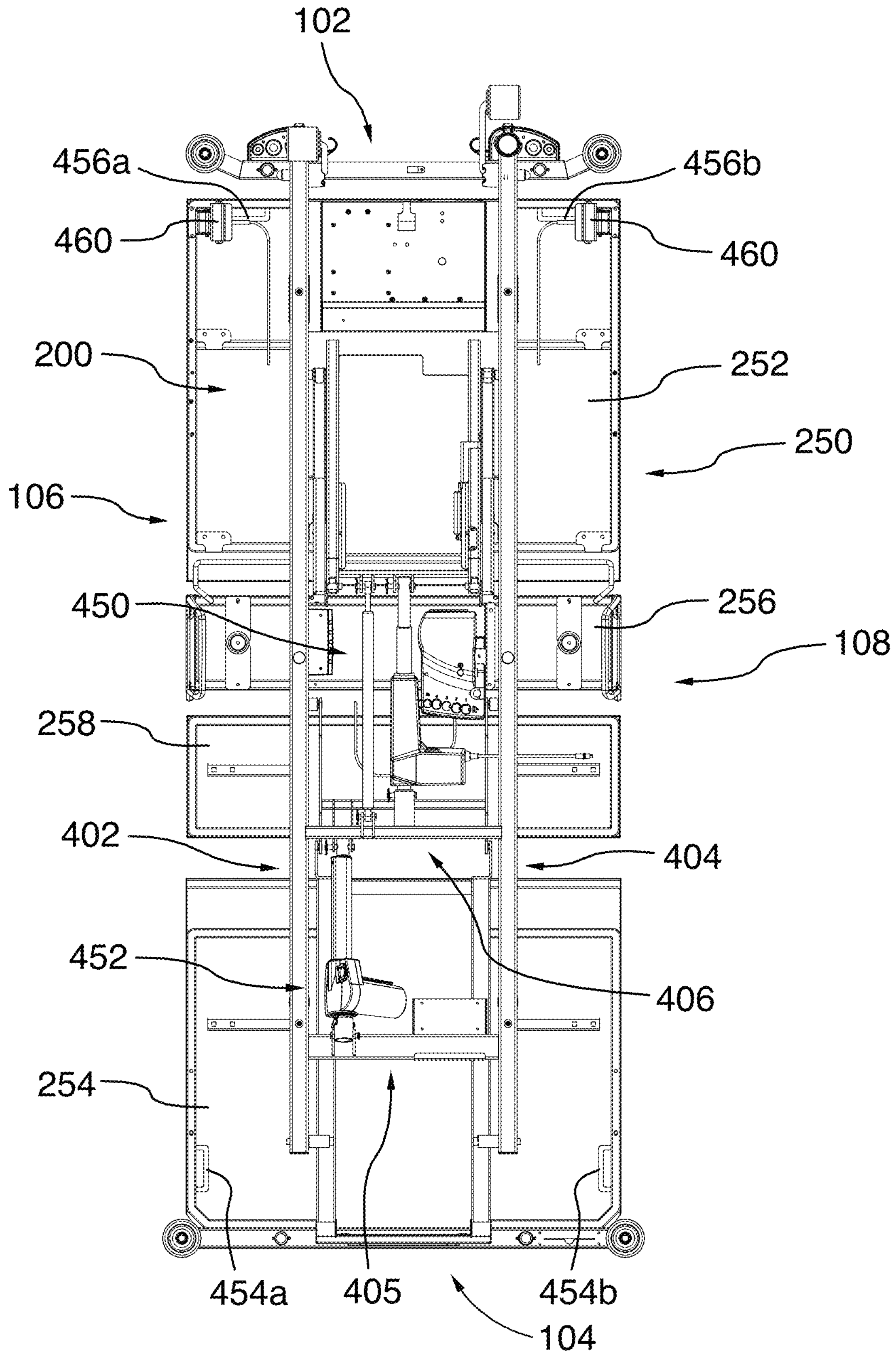
FIG. 4 is a bottom plan view of the patient support assembly illustrated in FIG. 2.

Now referring to FIG. 4, the frame 200 includes a pair of longitudinal frame members 402, 404 and a plurality of transversal frame members extending between the longitudinal frame members 402, 404. In the illustrated embodiment, the plurality of transversal members include a foot transversal member 405 located near the foot end 104 of the bed 100 and an intermediate transversal member 406 which is disposed between the foot transversal member 405 and the head end 102 of the bed 100. Alternatively, the frame 200 could include additional transversal members, or a single transversal frame member instead of a plurality of transversal members.

The bed 100 further includes a backrest pivoting system 450 connecting the backrest 252 to the frame 200 for pivoting the backrest 252 relative to the frame 200. In the illustrated embodiment, the bed 100 further includes a lower body pivoting system 452 connecting the lower body support panel 254 and the core support panel 258 adjacent the lower body support panel 254 for pivoting the lower body support panel 254 and the core support panel 258 relative to the frame 200. The backrest pivoting system 450 and the lower body pivoting system 452 will be described further below.

Still referring to FIG. 4, the bed 100 may further comprise a plurality of hidden hooks for restraining straps which extend below the patient support surface 250. In the illustrated embodiment, the plurality of hidden hooks includes left and right foot hooks 454*a*, 454*b* and left and right head hooks 456*a*, 456*b*.

The bed 100 may further comprise a release or CPR handle assembly operatively connected to the backrest pivoting system 450. The CPR handle assembly may be used in emergency situations by medical personnel to de-couple the backrest 252 from the backrest pivoting system 450 to rapidly pivot the backrest 252 to a neutral non-pivoted position, where the backrest 252 lies directly on the frame 200. In the illustrated embodiment, the bed 100 comprises left and right CPR handle assemblies 460 located respectively near the left and right sides 105, 107 of the bed 100 under the backrest 252. It will be appreciated that providing a CPR handle assembly on both the left and right sides of the bed 100 allows the backrest 252 to be rapidly pivoted down regardless of whether the operator of the CPR handle assembly is standing on the left side or the right side 105, 107 of the bed 100. Alternatively, the bed 100 may comprise a single CPR handle assembly located near one of the left and right sides 105, 107 of the bed 100, or elsewhere on the bed 100 (for example, at the head end 102 of the bed 100).

Figure 4A:
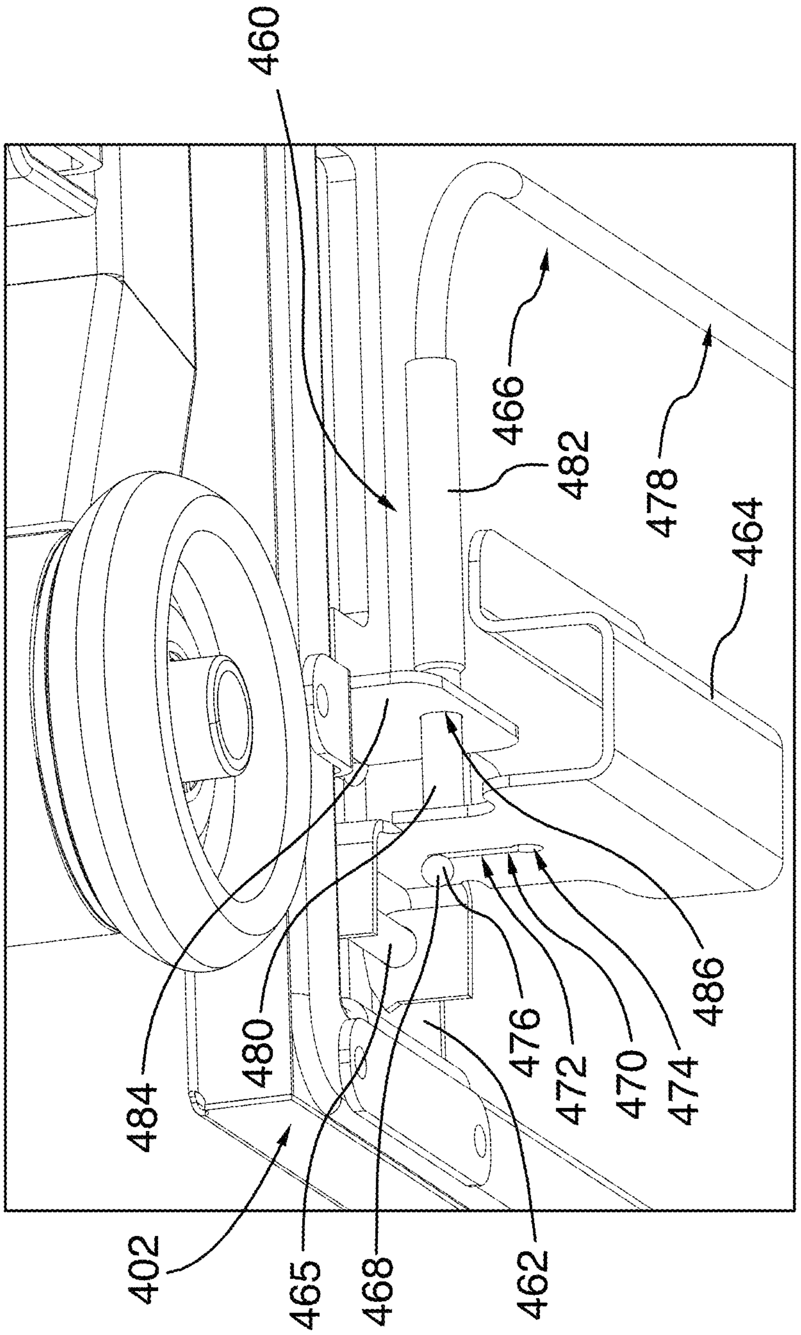
FIG. 4A is a partial bottom perspective view of the patient support assembly illustrated in FIG. 2, taken from area A-A of FIG. 4, enlarged to show details of the left CPR handle assembly.

Turning to FIG. 4A, the left CPR handle 460 will now be described. It will be understood that the same description also applies for the right CPR handle. In the illustrated embodiment, the CPR handle 460 comprises a Bowden cable assembly. More specifically, the CPR handle 460 includes a CPR mounting bracket 462 secured to the backrest 252 and a handle member 464 pivotably connected to the CPR mounting bracket 462 via a pin 465. The CPR handle 460 further comprises a cable 466 which has a first end 468 connected to the handle member 464 and a second end (not shown) connected to the backrest pivoting system 450. Specifically, the handle member 464 includes a vertical slot 470 which has a straight top portion 472 and a bottom circular portion 474 having a diameter greater than the width of the top portion 472. The first end of the cable 466 comprises an enlarged spherical head 476 which has a diameter which is greater than the width of the top portion 472, but which is smaller than the diameter of the bottom circular portion 474. This allows the first end 468 of the cable 466 to be inserted through the bottom circular portion 474 and to be slid in the top portion 472 to be retained therein.

Furthermore, the cable 466 extends within a sheath 478 which includes an end portion 480 and an enlarged diameter portion 482 adjacent the end portion 480. The CPR mounting bracket 462 further comprises a vertical panel 484 having a hole 486 therein. The hole 486 has a diameter which is greater than the diameter of the end portion 480 of the sheath 478 such that the hole 486 may receive the end portion 480, but which is smaller than the enlarged diameter portion 482. In this configuration, when a user pulls on the handle member 464, the handle member 464 pivots about the pin 465 towards the corresponding longitudinal frame members 402 and pulls on the cable 466. The enlarged diameter portion 482 of the sheath 478 abuts against the vertical panel 484 and prevents the sheath 478 from moving towards the handle member 464, causing the cable 466 to move relative to the sheath 478 to thereby disengage the backrest pivoting system 450, as will be further explained below. The handle member 464 may further be biased such that releasing the handle member 464 returns the handle member 464 to its initial position. The biasing may be caused by a resilient member connected to the handle member 464 and/or to the pin 465, or using any other biasing means known to the skilled addressee.

Alternatively, the CPR handle assemblies 460 could be configured according to one of various other configurations. For example, the CPR handle assemblies 460 could comprise a handle which is connected to the backrest pivoting system 450 via a hydraulic line or an electrical/optical connection. A button or any other device that could be activated by a user may also be provided instead of a handle.

Figure 5:
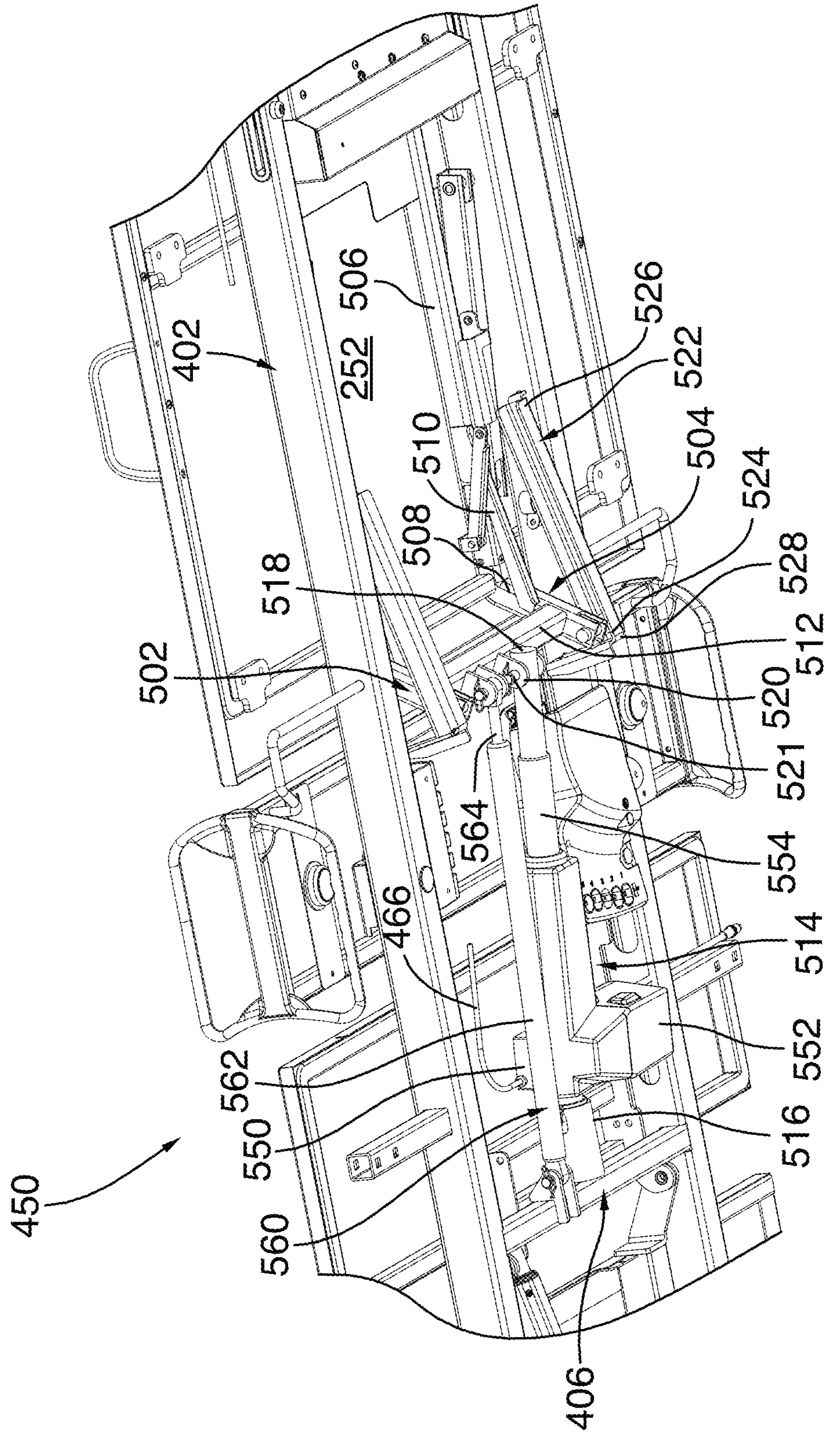
FIG. 5 is a partial bottom perspective view of the patient support assembly illustrated in FIG. 2, enlarged to show details of the backrest pivoting system.
Figure 5A:
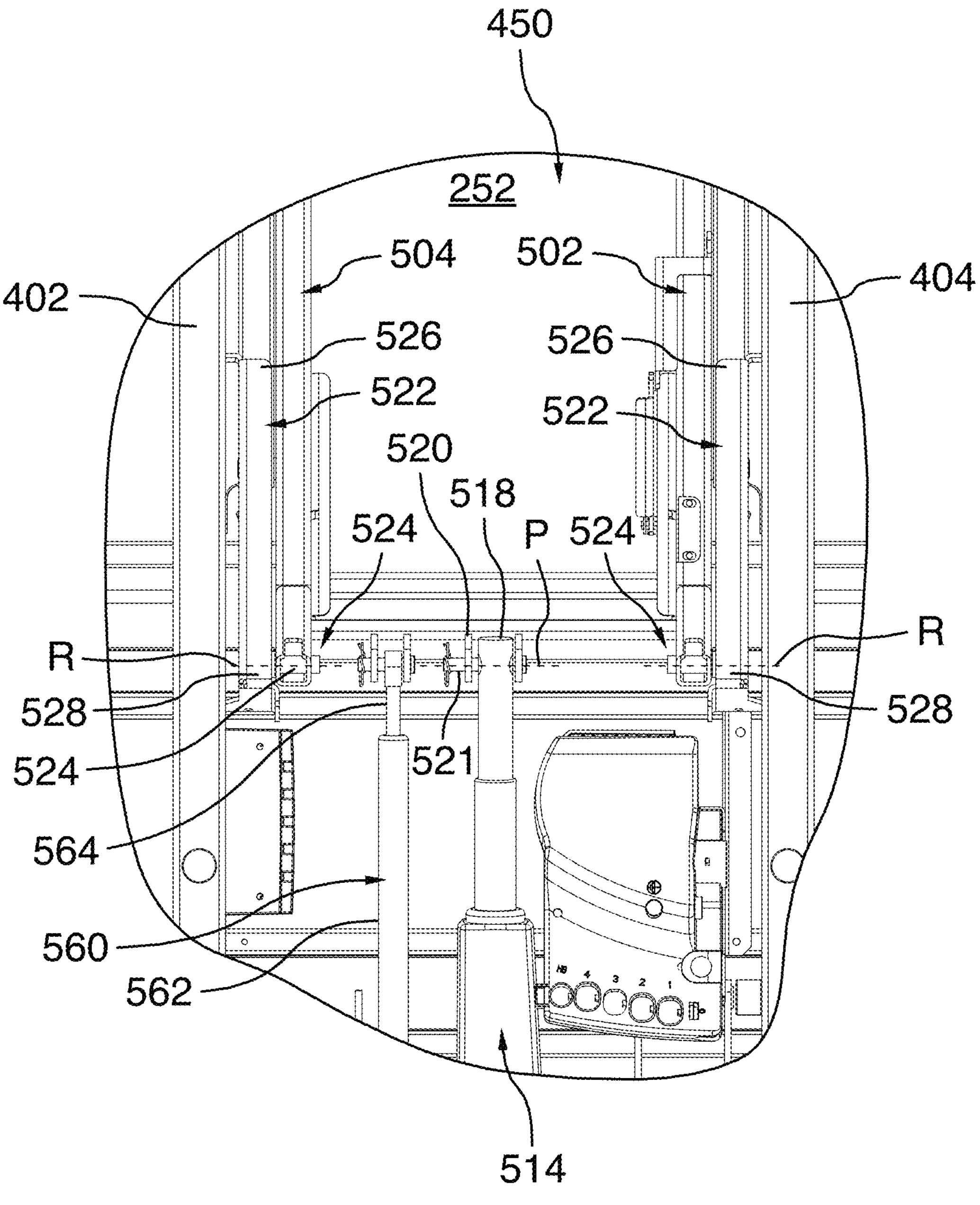
FIG. 5A is a partial bottom plan view of the patient support assembly illustrated in FIG. 2, enlarged to show details of the backrest pivoting system.

Now turning to FIGS. 5 to 9A, the backrest pivoting system 450 includes left and right lever arms or members 502, 504 which are spaced from each other and disposed generally longitudinally relative to the backrest 252. As best shown in FIG. 5A, the lever members 502, 504 are disposed between the left and right frame members 402, 404 and are generally parallel thereto.

In the illustrated embodiment, each lever member 502, 504 has a generally dogleg shape (generally resembling the shape of a hockey stick) and includes a first linear portion 506 which extends along the underside of the backrest 252 and a second linear portion 508 which is angled downwardly away from the backrest 252 and which extends towards the foot end 104 of the bed 100. In one embodiment, the second linear portion 508 is angled relative to the first linear portion 506 by an angle of 117 degrees. Alternatively, the second linear portion 508 could be angled relative to the first linear portion 506 by a different angle.

Still in the illustrated embodiment, a bracket member 510 further extends between the first and second linear portions 506, 508 of each lever member 502, 504 to reinforce the lever member 502, 504 and prevent bending and/or cracking. A transverse lever member 512 further extends generally horizontally between the second linear portion 508 of the left lever member 502 and the second linear portion 508 of the right lever member 504. The transverse lever member 512 connects the left and lever members 502, 504 together and allows them to move as one when a force is applied on the transverse lever member 512, as will be explained further below.

The backrest pivoting system 450 further includes a backrest actuator 514 for moving the backrest 252 relative to the frame 200. The backrest actuator 514 comprises a first actuator end 516 and a second actuator end 518. When the backrest actuator 514 is actuated, the second actuator end 518 moves away from the first actuator end 516. The backrest actuator 514 further comprises a first actuator portion 552 located near the first actuator end 516, a second actuator portion 555 located near the second actuator end 518 and a transmission 550 operatively coupling the first actuator portion 552 to the second actuator portion 554 to permit movement of the second actuator portion 554 relative to the first actuator portion 552. In the illustrated embodiment, the transmission 550 is operatively connected to the CPR handle assemblies 460 via the cable 466 such that operation of at least one of the CPR handle assemblies 460 enables the second actuator portion 554 to be selectively coupled and uncoupled from the first actuator portion 552, as will be further explained below.

Still in the illustrated embodiment, the first actuator portion 516 is operatively connected to the frame 200, and more specifically to the intermediate transversal member 406 of the frame 200, to allow the backrest actuator 514 to pivot relative to the frame 200, as will be explained further below. The second actuator end 518 is pivotably connected to the transverse lever member 512 via a pivot bracket 520 depending from the transverse member 512. A pivot pin 521 engages both the second actuator end 518 and the pivot bracket 520. The pivot pin 521 thereby acts as a pivot which defines a pivot axis P between the backrest 252 and the backrest actuator 514 which allows the backrest 252 to pivot relative to the backrest actuator 514, as will be further explained below.

In one embodiment, the backrest actuator 514 is an electric actuator including a motor and an endless screw, which enables the backrest 252 to be pivoted with a relatively high level of precision and in a relatively smooth and continuous movement, regardless of the weight of the patient. Alternatively, the backrest actuator 514 could be a pneumatic actuator, a hydraulic actuator or any other type of actuators which may be considered suitable for use with the bed 100.

The backrest pivoting system 450 further includes left and right guide rails 522 secured to the frame 200 and left and right guide members 524 which are configured to travel along the left and right guide rails 522, respectively. The left and right guide members 524 are configured to guide the backrest 252 during actuation of the backrest actuator 514 along a predetermined path defined by the guide rails 522, as will be further explained below.

Figure 5B:
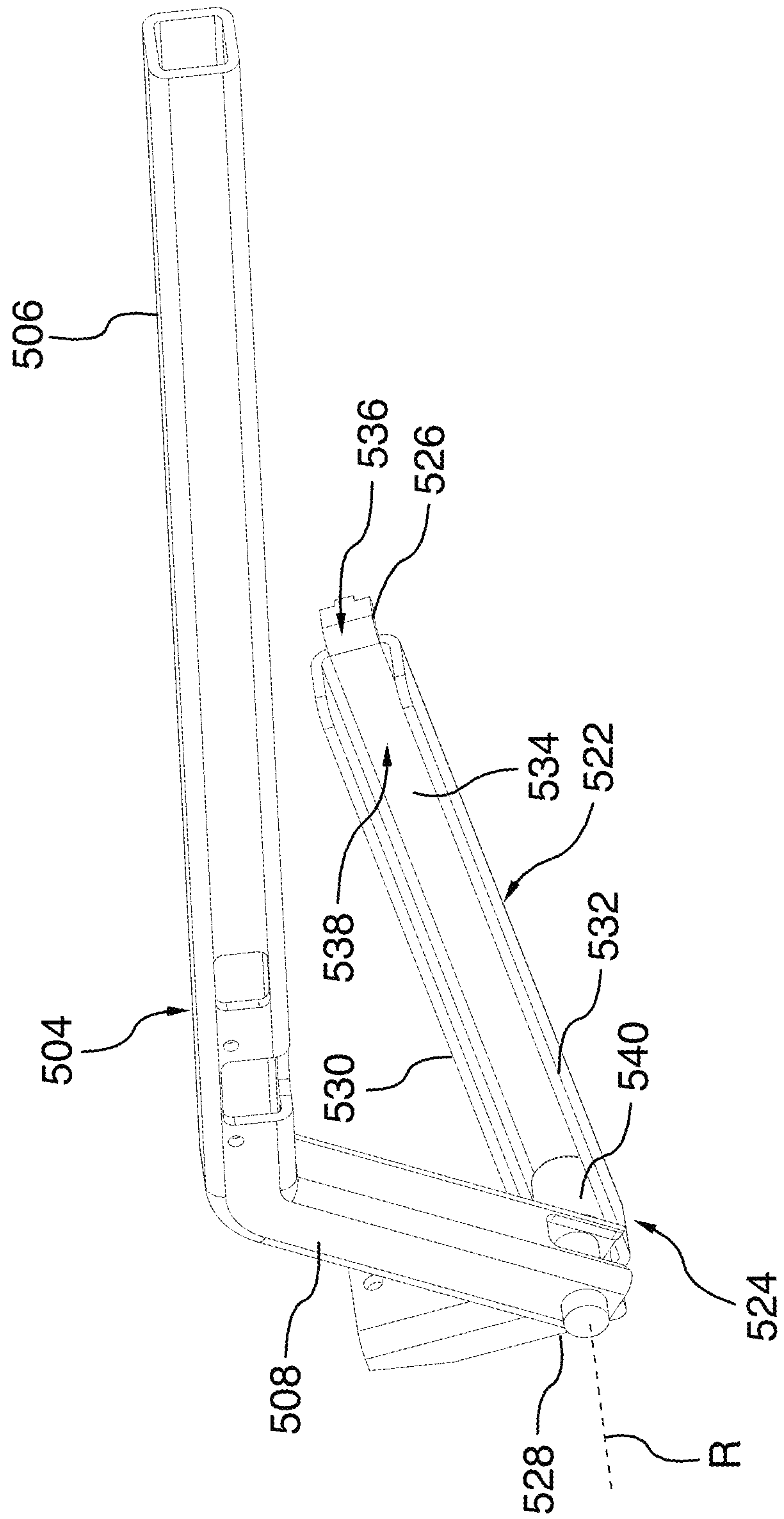
FIG. 5B is a perspective view of the right lever member, the right guide rail and the right guide member of the backrest pivoting system illustrated in FIG. 2, shown in isolation to better appreciate the configuration of these elements.

Referring specifically to FIG. 5B, each guide rail 522 has a front end 526 located towards the head end 102 of the bed 100 and a rear end 528 which is located towards the foot end 104 of the bed 100. In the illustrated embodiment, each guide rail 522 has a generally C-shaped cross-section and includes top and bottom faces 530, 532 which extend parallel to each other and a lateral face 534 which extends between the top and bottom faces 530, 532, perpendicularly thereto. The top and bottom faces 530, 532 are spaced from each other to define therebetween an open channel 536 which has an open side 538 opposite the lateral face 534. The guide rails 522 are oriented such that the lateral faces 534 are generally vertical and the open sides 538 of the left and right guide rails 522 face towards each other. Alternatively, the guide rails 522 could have any other configuration suitable to guide the guide members 524 along a predetermined path.

In the illustrated embodiment, the guide members 524 includes left and right roller members 540 which are rotatably connected to the second linear portion 508 of the left and right lever members 502, 504. The left and right roller members 540 are oriented outwardly relative to the bed 100, thereby facing away from each other. The open channels are sized to receive the roller members 540 which rotate about a rotation axis R which extends in a generally normal direction relative to the lateral face of the guide rail. As best shown in FIG. 5A, the rotation axes R of the roller members 540 are disposed such that they are both coaxial with the pivot axis P defined between the backrest actuator 514 and the backrest 252. In this configuration, the backrest actuator 514 is able to push and thereby move the backrest 252 without creating an additional moment on the lever members 502, 504. This reduces the force that needs to be applied by the backrest actuator 514 to move the backrest 252. As will become apparent below, this also reduces the stress in the lever members 502, 504 during pivoting of the backrest 252 and thereby prevents damage to the lever members 502, 504.

Alternatively, other types of guide members may be used instead of roller members. For example, the guide members could instead include sliding members which are pivotably connected to the second linear portion 508 of the left and right lever members 502, 504. Instead of rolling along the guide rails 522, the sliding members would slide along the guide rails when the actuator is extended or retracted, while still allowing the backrest 252 to pivot relative to the frame 200.

In the illustrated embodiment, the left and right guide rails 522 are angled relative to the frame 200. More specifically, the rear end 528 of the guide rails 522 is disposed below the front end 526. The left and right guide rails 522 therefore guide the backrest 252 upwardly and away from the first end of the actuator (i.e. away from the foot end 104 of the bed 100) when the backrest actuator 514 is retracted and the backrest 252 is pivoted away from the frame 200. When the backrest actuator 514 is retracted, the left and right lever members 502, 504 and the backrest 252 are moved downwardly and towards the foot end 104 of the bed 100. In one embodiment, the guide rails 522 may be angled at an angle of 12 degrees relative to the horizontal. Alternatively, the guide rails 522 may be angled at a different angle.

Figure 6:
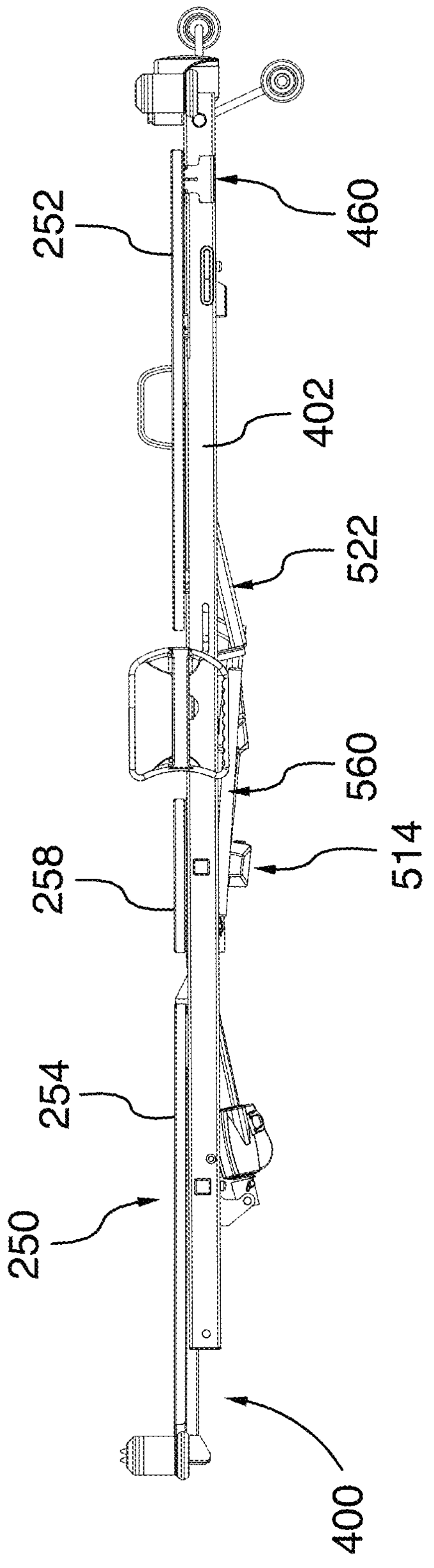
FIG. 6 is a side elevation view of the patient support assembly illustrated in FIG. 2, with the backrest abutting the frame.

The backrest pivoting system 450 further includes left and right pivoting links 610 (best shown in FIG. 6B) which cause the backrest 252 to pivot as the guide members 524 move along the guide rails 522 when the backrest actuator 514 is extended or retracted, as will be further explained below. Each pivoting link 610 has a rear end 612 pivotably connected to the backrest 252 and a front end 614 pivotably connected to a respective one of the longitudinal frame members 402, 404. The second end 614 of the pivoting links 610 is located between the head end 102 of the bed 100 and the front end 526 of the guide rails 522. In the illustrated embodiment, the rear end 612 of the pivoting links 610 is pivotably connected to the first linear portion 506 of the left and right lever members 502, 504.

In the illustrated embodiment, there is also provided a damper 560 connected in parallel to the backrest actuator 514. The damper 560 is configured to provide damping during the pivoting of the backrest 252 towards the frame 200 in order to prevent the pivoting of the backrest 252 to be too rapid and/or brutal. This is particularly useful during the operation of the CPR handle assemblies 460, as will become apparent below.

More specifically, the damper 560 comprises a first damper portion 562 pivotably connected to the intermediate transversal member 406 and a second damper portion 564 movable relative to the first damper portion 562 and pivotably connected to the transverse lever member 512. This configuration allows the damper 560 to be angled relative to the frame 200 in order to follow movement of the transverse lever member 512 as the backrest 252 is pivoted. The damper 560 could be a hydraulic damper, a magnetic damper or any other type of dampers known to the skilled addressee.

Figure 6A:
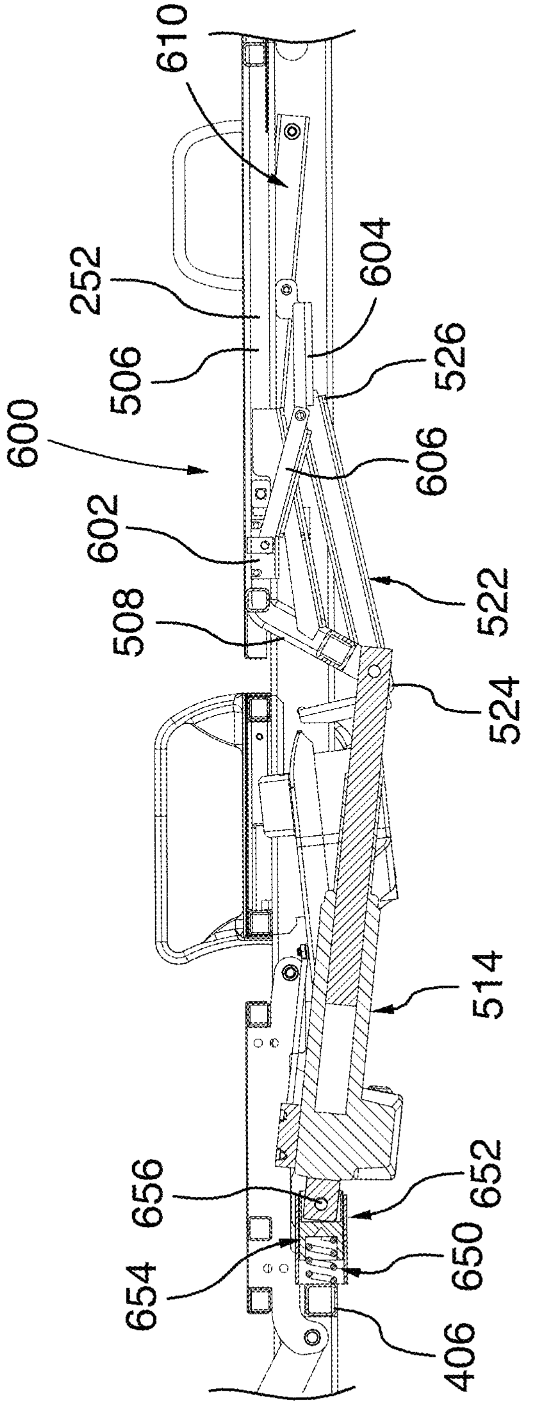
FIG. 6A is an enlarged cross-sectional view of the patient support assembly illustrated in FIG. 6, taken along cross-section line X-X of FIG. 3.
Figure 6B:
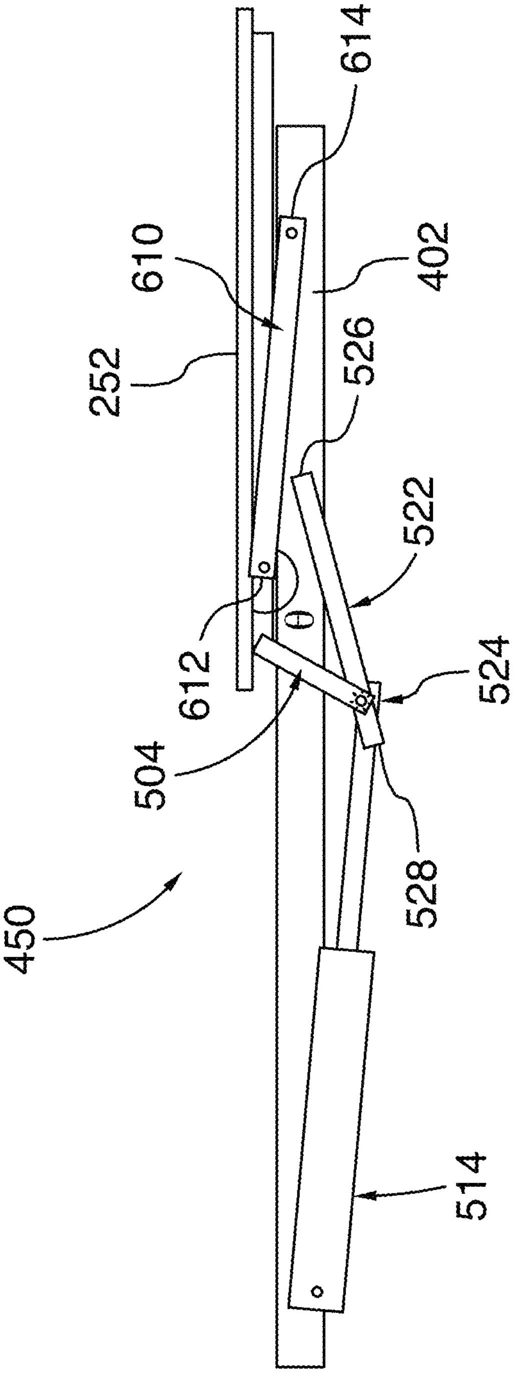
FIG. 6B is a schematic drawing of the patient support assembly illustrated in FIG. 6, with only the backrest and the right frame member, guide rail, guide member, lever member and pivoting link shown and all other parts removed for clarity.

Now referring to FIG. 6A, the backrest pivoting system 450 may further comprise an orientation sensor 600 (best shown in FIG. 6A) operatively connected to the backrest 252 to monitor the orientation of the backrest 252. In the illustrated embodiment, the orientation sensor 600 comprises a rheostat or potentiometer 602 which is embedded into the first linear portion 506 of the right lever member 504. The orientation sensor 600 further comprises a first sensor arm 604 pivotably connected to the guide arm 700 and a second sensor arm 606 pivotably connected to the first sensor arm 604 and to the potentiometer 602. It will be appreciated that this configuration enables the orientation sensor to monitor the orientation of the backrest 252 without interfering with the movement of the backrest 252. Alternatively, the orientation sensor may comprise another type of orientation sensor, such as a gyroscope or any other orientation sensor known to the skilled addressee.

Still referring to FIG. 6A, the backrest actuator 514 may further be mounted in series with a resilient member. The resilient member may help to prevent the pivoting of the backrest 252 from stopping too abruptly when the CPR handles are used, which could cause discomfort or harm to the patient and to the medical personnel, as well as damage the electronic and mechanical components of the bed 100, especially the gears of the backrest actuator 514.

In the illustrated embodiment, the resilient member is a helical spring 650 which is housed in a housing 652 secured to the intermediate transversal member 406 of the frame 200. The helical spring 650 is sandwiched between the intermediate transversal member 406 and a piston 654 which is pivotally connected to the first actuator portion 552 by a pivot pin 656. In the illustrated embodiment, the pivot pin 656 extends through elongated openings in the housing 652, which allows the pivot pin 656 and the piston 654 to move towards the transverse member 406 to compress the helical spring 650.

In one embodiment, the helical spring 650 is calibrated to be as strong as the maximum load on the backrest actuator 514 when a full load is present on the sleep surface. It can also be compressed under the action of a sudden rotation of the backrest 252. In one embodiment, the spring has a capacity of about 1000 lbs/in and a compression of about ¼ in.

Operation of the backrest pivoting system 450 for pivoting of the backrest 252 from a non-pivoted position, shown in FIGS. 6 and 6A, to a fully pivoted position, shown in FIGS. 9 and 9A, will now be described in accordance with one embodiment.

In the non-pivoted position shown in FIGS. 6 and 6A, the backrest 252 abuts the frame 200. In this position, the backrest 252 is generally parallel to the core support panel 256 located adjacent to the backrest 252. In the illustrated embodiment, the backrest actuator 514 is angled downwardly relative to the frame 200. More specifically, the backrest actuator 514 is angled downwardly by an angle of 6 degrees. Alternatively, the actuator could be at a different angle relative to the frame 200 when the backrest 252 is in the non-pivoted position.

Still in the illustrated embodiment, the pivoting links 610 are angled upwardly relative to the frame 200 by an angle of 5 degrees when the backrest 252 is in the non-pivoted position. Alternatively, the pivoting links 610 could be at a different angle relative to the frame 200 when the backrest 252 is in the non-pivoted position.

To start the pivoting of the backrest 252, the backrest actuator 514 is actuated. In one embodiment, the backrest actuator 514 is actuated via the control interface which is operatively connected to the backrest actuator 514. Alternatively, the backrest actuator 514 could be actuated using mechanical controls, or using any other means known to the skilled addressee.

To pivot the backrest 252 upwardly from the non-pivoted position, the backrest actuator 514 is extended such that the second actuator end 518, which is pivotably connected to the lever members 502, 504 via the transverse lever member 512, moves away from its first end 516. The backrest actuator 514 thereby pushes against the transverse lever member 512, which causes the guide members 524, also connected to the lever members 502, 504, to travel along the guide rails 522.

Figure 7:
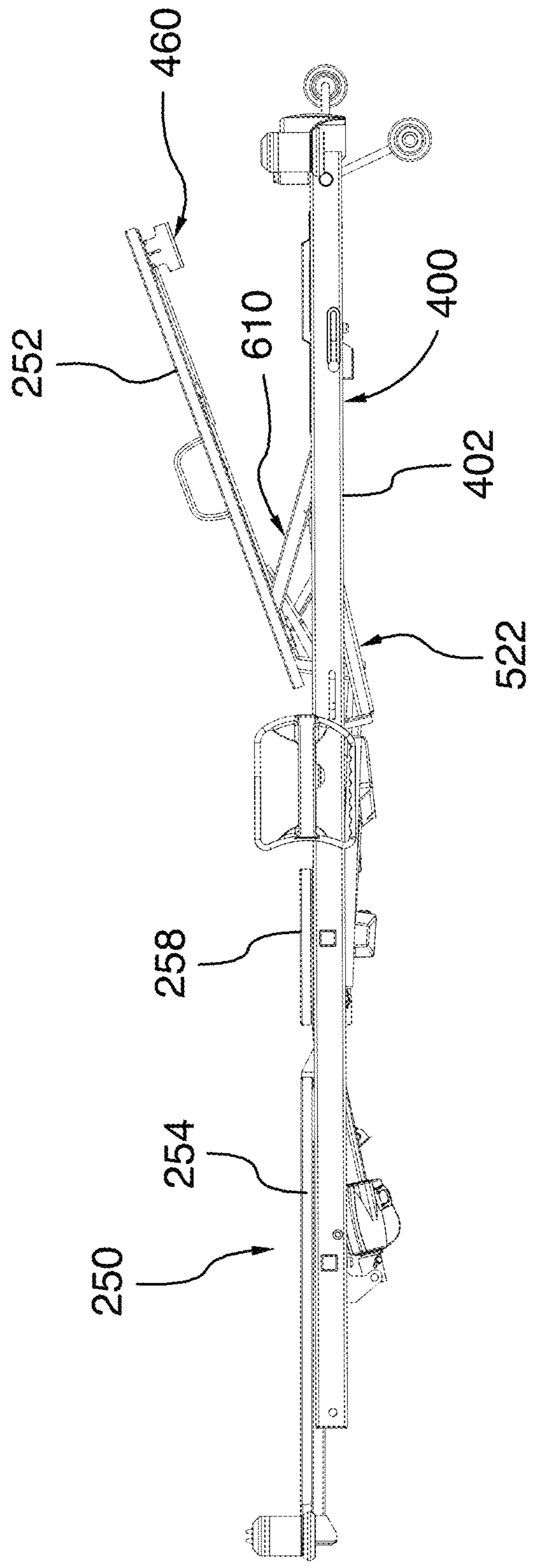
FIG. 7 is a side elevation view of the patient support assembly similar to that illustrated in FIG. 2, with the backrest pivoted upward at a 20-degree angle relative to the frame.
Figure 7A:
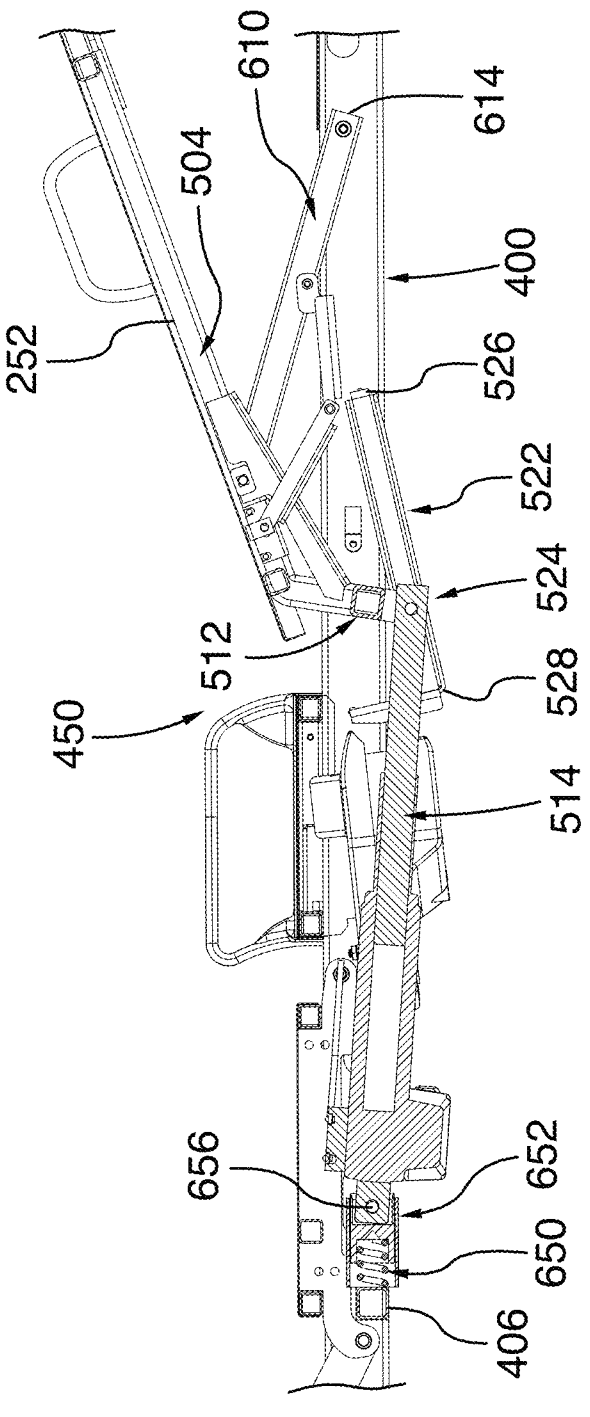
FIG. 7A is an enlarged cross-sectional view of the patient support assembly similar to that illustrated in FIG. 6A, with the backrest pivoted upward at a 20-degree angle relative to the frame.
Figure 7B:
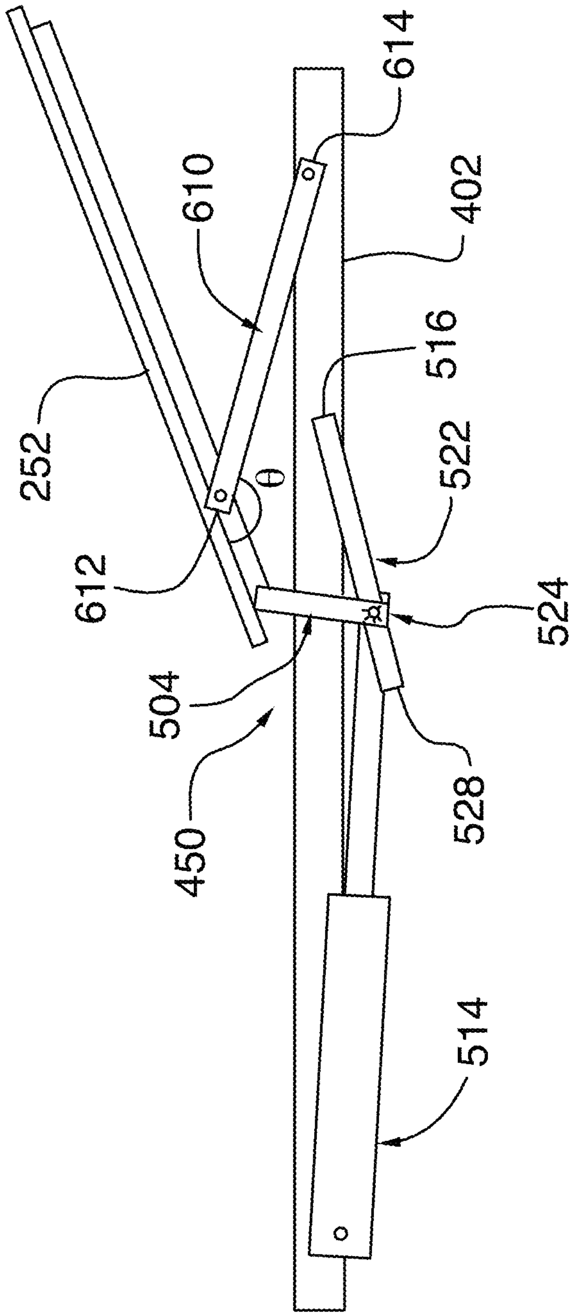
FIG. 7B is a schematic drawing of the patient support assembly similar to that illustrated in FIG. 6B, with the backrest pivoted upward at a 20-degree angle relative to the frame.

In FIGS. 7 to 7B, the backrest 252 is shown pivoted at an angle of 20 degrees relative to the frame 200. In this position, the roller members 524 have been moved along the guide rails 522 from the rear end 528 of the guide rails 522 partway towards the front end of the guide rails 522. Due to the upward angle of the guide rails 522, this movement along the guiderails 522 causes the roller members 524 to be moved upwardly and forwardly towards the head end 102 of the bed 100. Since the rear end 612 of the pivoting link 610 is pivotably connected to the backrest 252 via the lever members 502, 504, the movement of the roller members frontwardly along the guide rails 522 causes both the pivoting links 610 and the backrest 252 to pivot upwardly relative to the frame 200. As the pivoting links 610 and the backrest 252 pivot upwardly, the angle θ between the pivoting links 610 and the backrest 252 is therefore reduced (i.e. the angle θ becomes more acute), as best shown in FIG. 7B.

Specifically, each pivoting link 610 pivots such that its rear end 612 is raised while its front end 614, which is pivotably connected to the left frame member 402, remains at the same location. Since FIGS. 7 and 7A show the left side 105 of the bed 100, the pivoting links 610 are therefore shown being pivoted in a clockwise direction relative from the non-pivoted position shown in FIGS. 6 and 6A. Simultaneously, the backrest 252 is also pivoted, but in opposite direction to the direction in which the pivoting links 610 are pivoted. In FIGS. 7 and 7A, the backrest 252 is therefore shown being pivoted in a counter-clockwise direction. Specifically, the backrest 252 is pivoted relative to the guide rail 200 about the roller member 540, which therefore defines a movable pivot point for the backrest 252.

In the illustrated embodiment, when the backrest 252 is pivoted away from the frame 200, the backrest 252 no longer abuts the frame 200 and is therefore no longer supported by the frame 200. In this position, the pivoting links 610, which extend between the backrest 252 and the frame 200, act as truss members to support the backrest 252 and the patient laying on the bed 100.

It will be appreciated that as the roller members 540, which are pivotably connected to the lever members 502, 504, are moved upwardly and frontwardly, the transverse lever member 512, which is also connected to the lever members 502, 504, and the second actuator end 518 are also moved upwardly and frontwardly. Therefore, the backrest actuator 514 is also pivoted about its pivot pin 656 as it extends and retracts. When the backrest 252 is pivoted upwardly from the non-pivoted position, the angle between the backrest actuator 514 and the frame 200 is therefore reduced (i.e. the angle becomes more acute), as best shown in FIG. 7B.

Figure 8:
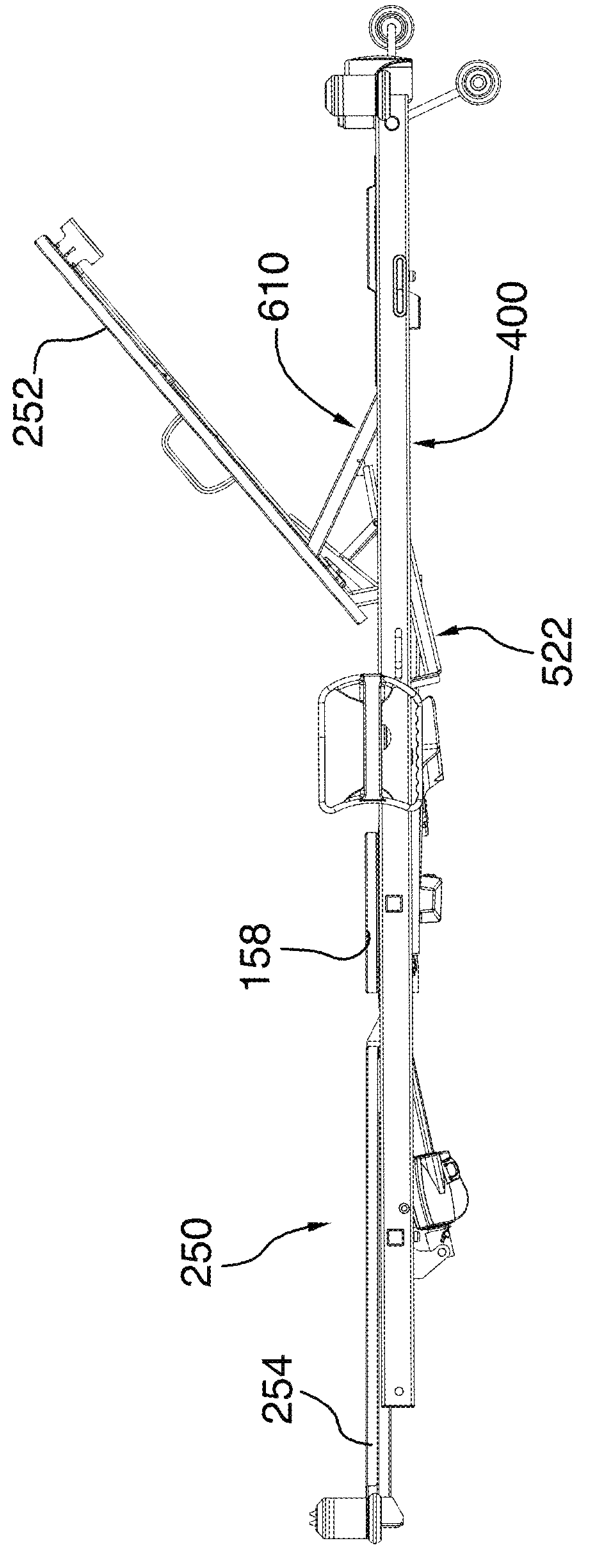
FIG. 8 is a side elevation view of the patient support assembly illustrated in FIG. 2, with the backrest pivoted upward at a 40-degree angle relative to the frame.
Figure 8A:
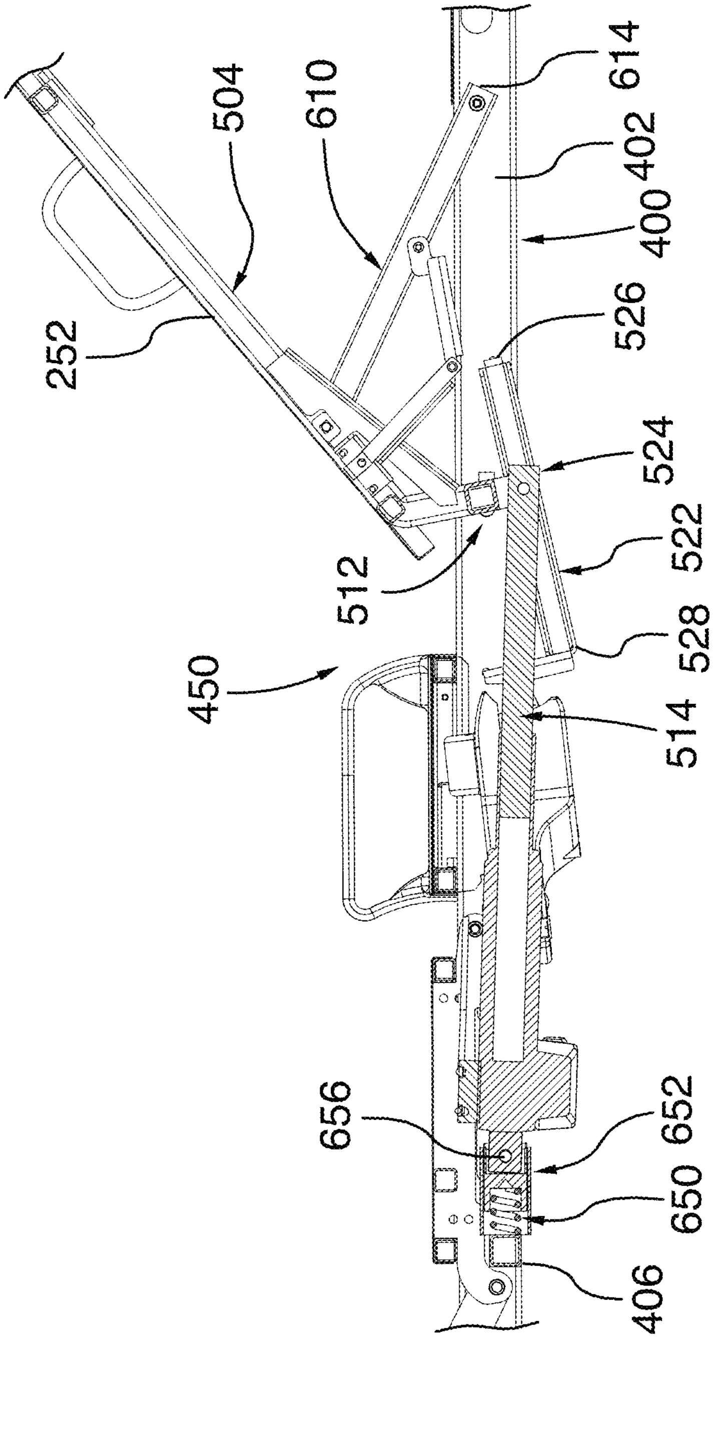
FIG. 8A is an enlarged cross-sectional view of the patient support assembly similar to that illustrated in FIG. 6A, with the backrest pivoted upward at a 40-degree angle relative to the frame.
Figure 8B:
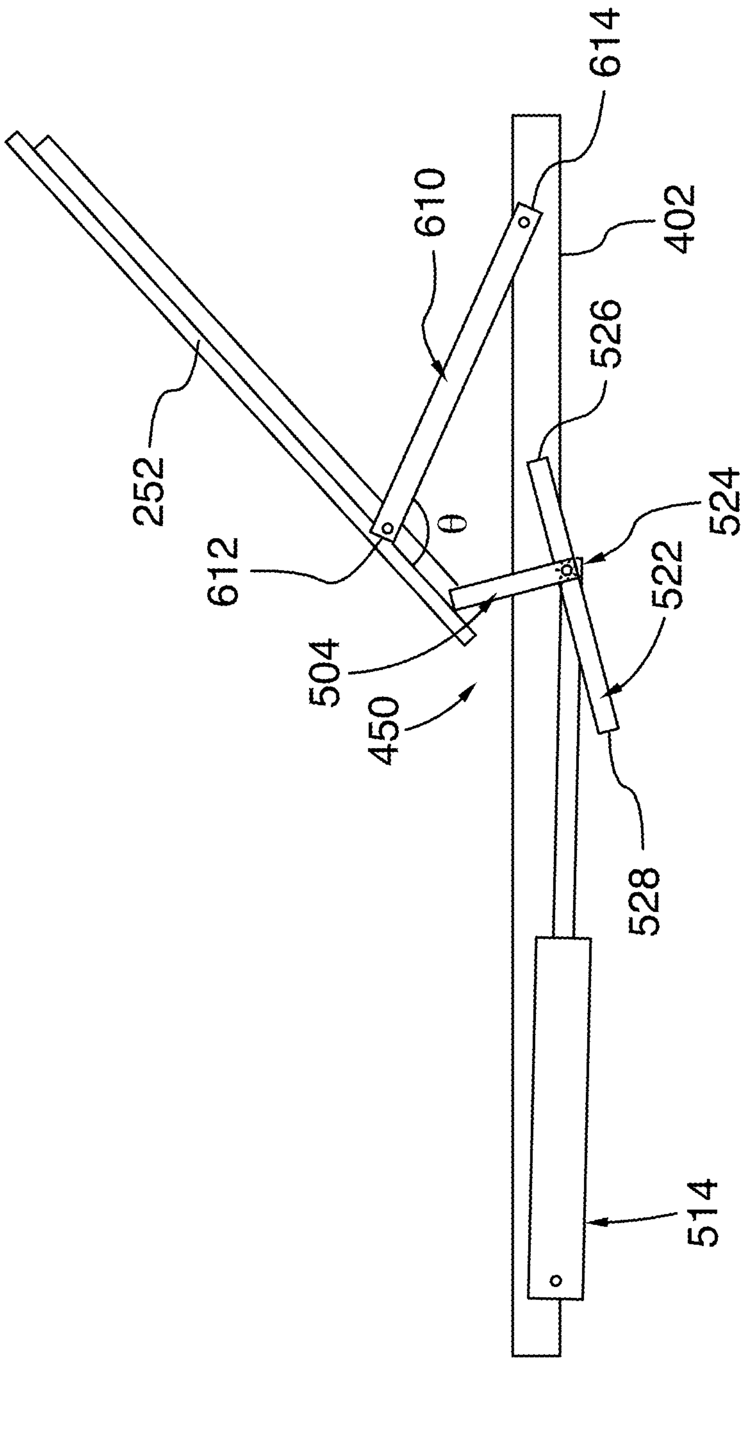
FIG. 8B is a schematic drawing of the patient support assembly similar to that illustrated in FIG. 6B, with the backrest pivoted upward at a 40-degree angle relative to the frame.

FIGS. 8 and 8A show the backrest 252 pivoted at a 40-degree angle relative to the frame 200. In this position, the backrest actuator 514 is further extended and the roller members 540 travel further along the guide rails 522, upwardly and towards the head end 102 of the bed 100. This causes both the backrest 252 and the pivoting links 610 to be further pivoted and the angle between the pivoting links 610 and the backrest 252 to be further reduced, as best shown in FIG. 8B. The angle between the backrest actuator 514 and the frame 200 is also further reduced as the roller members 524 travel further along the guide rails 522.

Figure 9:
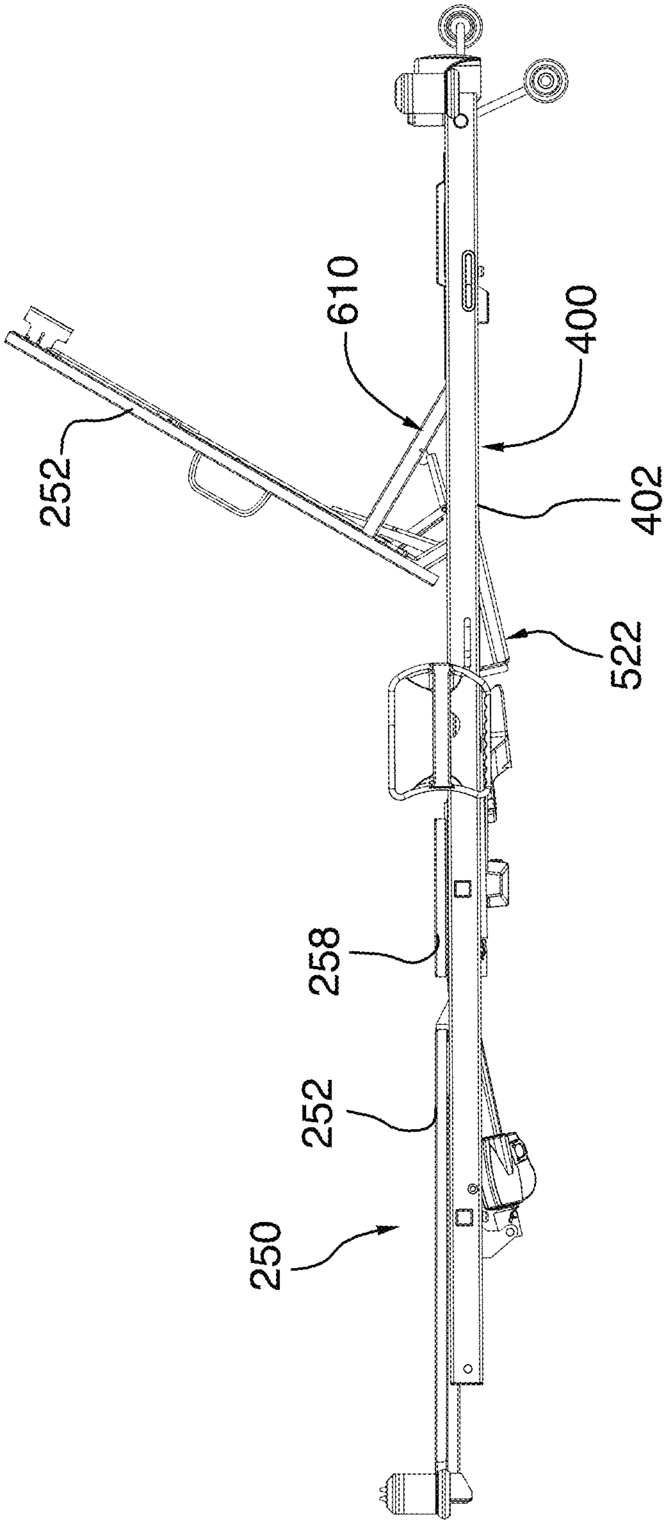
FIG. 9 is a side elevation view of the patient support assembly illustrated in FIG. 2, with the backrest pivoted upward at a 60-degree angle relative to the frame.
Figure 9A:
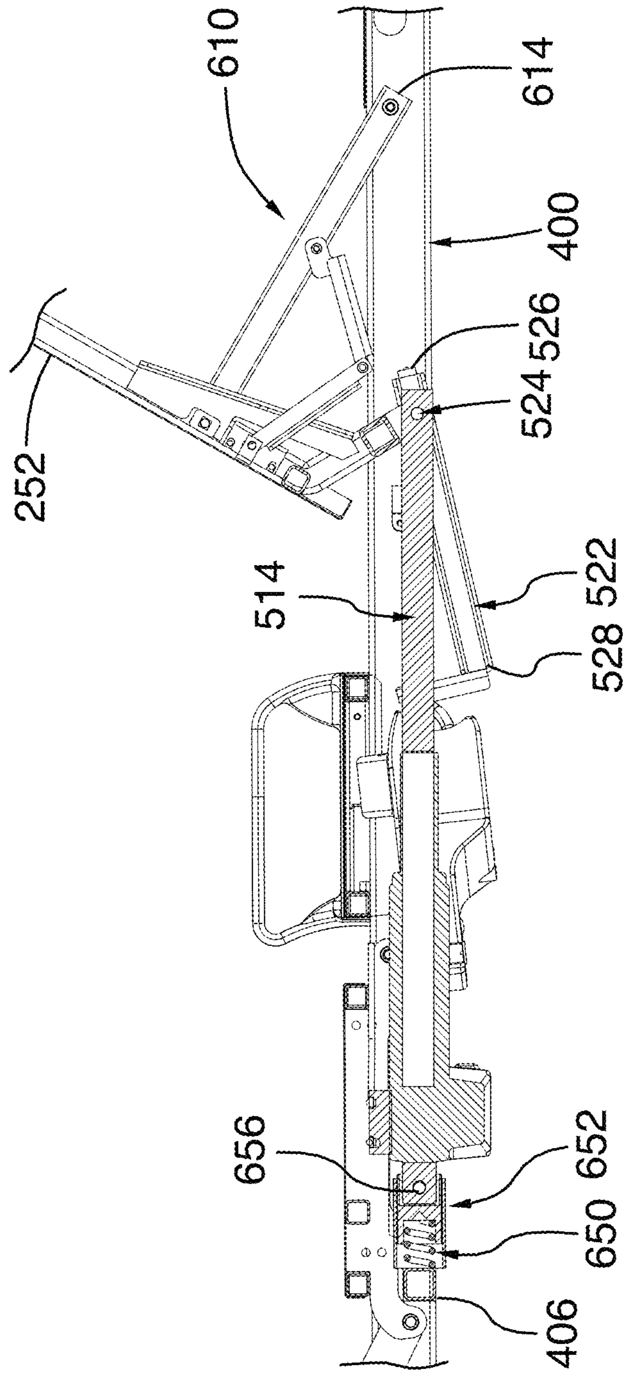
FIG. 9A is an enlarged cross-sectional view of the patient support assembly similar to that illustrated in FIG. 6A, with the backrest pivoted upward at a 60-degree angle relative to the frame.
Figure 9B:
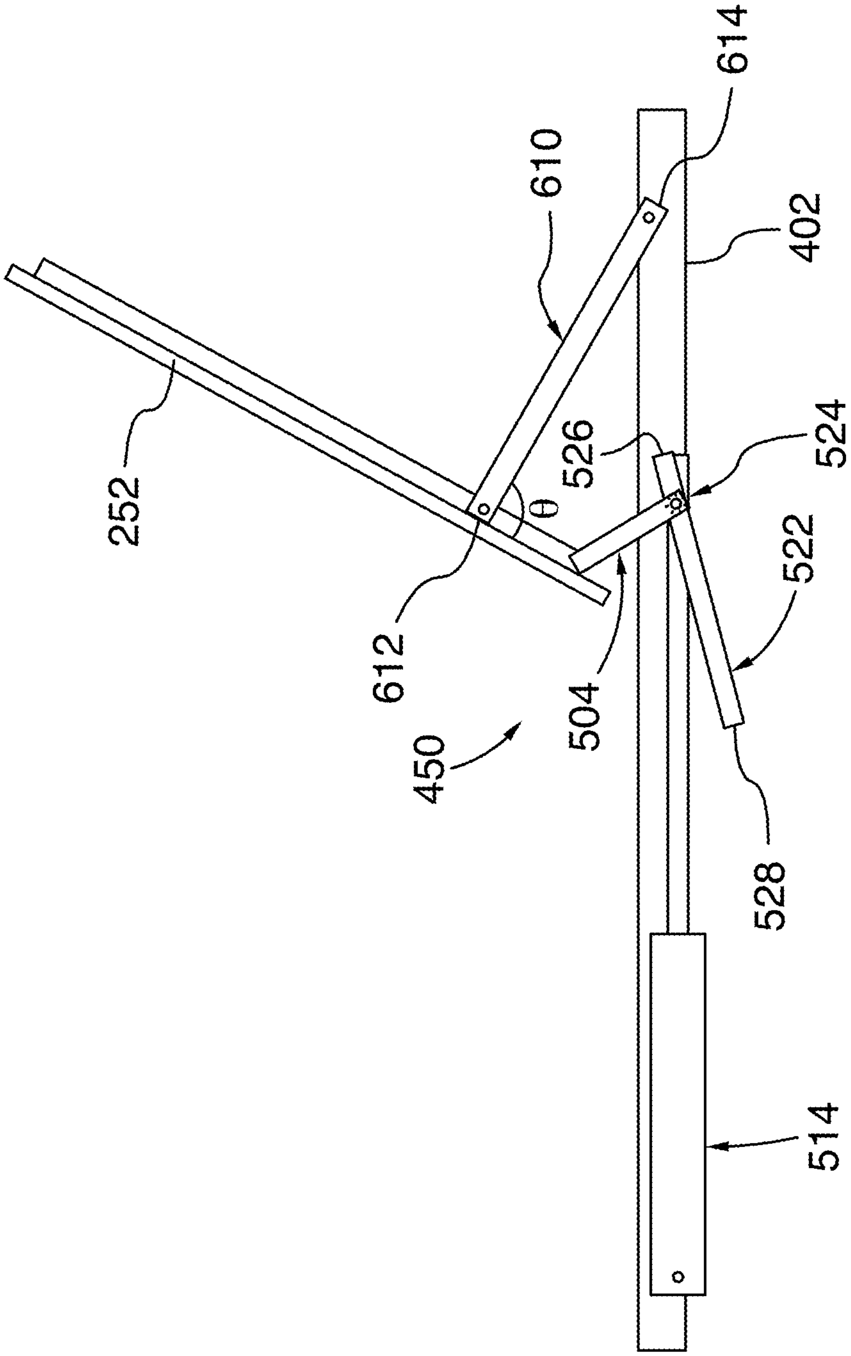
FIG. 9B is a schematic drawing of the patient support assembly similar to that illustrated in FIG. 6B, with the backrest pivoted upward at a 60-degree angle relative to the frame.

FIGS. 9 and 9A show the backrest 252 pivoted at a 60-degree angle relative to the frame 200. As the backrest actuator 514 is further extended, the backrest 252 is further pivoted and further moved along the guide rails 522, as described above. It will be understood that the pivoting of the backrest 252 could be stopped at any angle desired and is not limited to the specific angles shown in FIGS. 6 to 9A. It will also be understood that the backrest 252 could also be pivoted downwardly towards the non-pivoted position shown in FIGS. 6 and 6A by retracting the backrest actuator 514 instead of extending it.

It will be appreciated that in the bed 100 described herein, extension and retraction of the backrest actuator 514 therefore simultaneously causes both translation and pivoting of the backrest 252 relative to the frame 200. This configuration causes the patient's back to remain relatively well aligned with the backrest 252 as the backrest 252 is pivoted generally about the patient's hip axis and thereby prevents strain on the patient's back during this movement. This configuration further improves the patient's final position on the bed 100 when the seating position is achieved.

Referring to FIGS. 4A, 6A and 9A, an example of operation of one of the CPR handle assemblies 460 will now be described. In this example, the backrest 252 is pivoted down using the CPR handle assemblies 460 from the position shown in FIG. 9A, in which the backrest 252 is angled at 60 degrees relative to the frame 200, to the position shown in FIG. 6A, in which the backrest 252 is angled at 20 degrees relative to the frame 200. Although operation of a single CPR handle assembly 460 will be described, it will be understood that both of the CPR handle assemblies 460 work in the same manner, and that both CPR handle assemblies 460 could even be operated simultaneously to achieve the same result.

As explained above, the CPR handle assemblies 460 are operatively connected to the transmission 550 of the backrest actuator 514 via the cable 466. The CPR handle assemblies 460 can be moved between a locked position in which the first actuator portion 552 is coupled to the second actuator portion 554 via the transmission 550 and an unlocked position in which the transmission 550 is disengaged and the second actuator portion 554 is decoupled from the first actuator portion 552 to allow free pivoting of the backrest 252 towards the frame 200.

In the illustrated embodiment, the CPR handle assembly 460 is initially in the locked position in which no tension is exerted on the cable 466 of the CPR handle assemblies 460. Still in the illustrated embodiment, the handle member 464 is biased to maintain the CPR handle assemblies 460 in the locked position during normal operation of the bed 100. It will be appreciated that when the CPR handle assemblies 460 are in the locked position, the backrest actuator 514 may be extended or retracted to permit pivoting of the backrest 252 relative to the frame 200 as described above.

To move the CPR handle assemblies 460 from the locked position to the unlocked position, a user pulls on the handle member 464 of the CPR handle assembly 460, thereby pivoting the handle member 464 about the pin 465. The handle member 464 thereby pulls on the cable 466, which disengages the transmission 550 and therefore decouples the first actuator portion 552 from the second actuator portion 554. When at least the CPR handle assembly 460 is in the unlocked position, the backrest 252 naturally pivots down towards the frame 200 under the weight of the backrest 252 itself and/or of the patient lying on the bed 100. It will be appreciated that the damper 560 damps and therefore slows down this free downward pivoting. This can be useful for preventing both the patient and the user from being startled and/or injured by this free downward pivoting. However, it will be understood that this free downward pivoting is still faster than downwardly pivoting the backrest 252 by retracting the backrest actuator 514.

When the backrest 252 has reached a desired angle relative to the frame 200, the user releases the handle member 464, which is biased back towards the locked position. The transmission 550 is immediately re-engaged and the first actuator portion 552 is recoupled to the second actuator portion 554. The backrest 252 can then be pivoted again normally using the backrest actuation system 450, as described above. Alternatively, the handle member 464 may not be biased. In this case, the handle member 464 can be returned to its initial position manually by the user.

It will be appreciated that the movement of the CPR handle assembly 460 from the unlocked position to the locked position will cause the backrest 252 to decelerate abruptly or even come to a full stop as the transmission 550 is re-engaged. This creates an impact on the backrest actuator 514 and on the transmission 550. In the illustrated embodiment, at least part of the energy of this impact is absorbed by the helical spring 650, which compresses slightly when the handle member 464 is released to return the CPR handle assembly 460 to the locked position. This contributes to preventing damage in the transmission, especially inner components of the transmission 550 (e.g. gears) and damage to the backrest actuator 514.

Now referring to FIGS. 10 and 10A, the base 106 and the elevation system 110 will now be described. In the illustrated embodiment, the base 106 comprises a base frame 1000 having two longitudinal side members 1002, 1004, a head member 1006 located towards the head end 102 of the bed 100 and a foot member 1008 located opposite the head member 1006 towards the foot end 104 of the bed 100. In the illustrated embodiment, the head member 1006 and the foot member 1008 extend between the longitudinal side members 1002, 1004 such that the base frame 1000 defines a rectangular shape. The base 106 further comprises a head actuator bracket 1010 and a foot actuator bracket 1012 which respectively extend downwardly from the head member 1006 and the foot member 1008.

The elevation system 110 comprises a head elevation assembly 1014 located near the head end 102 of the bed 100 and a foot elevation assembly 1016 located near the foot end 104 of the bed 100. In the illustrated embodiment, the head and foot elevation assemblies 1014, 1016 are similar to each other. Specifically, the head and foot elevation assemblies 1014, 1016 are mirror images of each other. Therefore, only the foot elevation assembly 1016 will be described, with the same description applying to the head elevation assembly 1014.

The foot elevation assembly 1016 comprises left and right pivoting leg members 1018, 1020 and an elevation actuator 1022 connecting the base frame 1000 to the pivoting leg members 1018, 1020. Specifically, the elevation actuator 1022 has a lower end 1024 pivotably connected to the foot actuator bracket 1012 and an upper end 1026 pivotably connected to a transverse elevation member 1028 extending between the left and right pivoting leg members 1018, 1020, parallel to the foot member 1008 of the base frame 1000.

Each pivoting leg member 1018, 1020 comprises an upper end 1030 pivotably connected to a respective one of the left and right longitudinal frame members 402, 404 and a lower end 1032 pivotably and movably connected to a respective one of the longitudinal side members 1002, 1004 of the base frame 1000. More specifically, each longitudinal side member 1002, 1004 has a longitudinal track 1034 which faces inwardly relative to the bed 100, such that the longitudinal tracks 1034 of the two longitudinal side members 1002, 1004 face each other. A slider member 1036 is pivotably connected to the lower end 1032 of the pivoting leg members 1018, 1020 and slidably engages the corresponding longitudinal track 1034 to allow the lower end 1032 of the pivoting leg members 1018, 1020 to selectively slide towards the head end 102 and towards the foot end 104 of the bed 100.

In the illustrated embodiment, each longitudinal side member 1002, 1004 comprises a single longitudinal track adapted to receive the pivoting leg members 1018, 1020 of both the head elevation assembly 1014 and the foot elevation assembly 1016. Alternatively, each longitudinal side member 1002, 1004 could instead comprise two distinct longitudinal tracks: a front longitudinal track to receive the pivoting leg members 1018, 1020 of the head elevation assembly 1014 and a rear longitudinal track to receive the pivoting leg members 1018, 1020 of the foot elevation assembly 1016.

Still in the illustrated embodiment, the foot elevation assembly 1016 further comprises left and right pivoting links 1038, 1040 pivotably connecting the base frame 1000 to the left and right pivoting leg members 1018, 1020, respectively. A transverse link member 1042 further extends between the left and right pivoting links 1038, 1040, parallel to the transverse elevation member 1042 and the foot member 1008 of the base frame 1000. Each pivoting link 1038, 1040 has a generally dogleg shape (generally resembling the shape of a hockey stick) and has a lower end 1044 pivotably connected to a link bracket 1046 extending downwardly from the base frame 1000 and an upper end 1048 pivotably connected to a respective pivoting leg member 1018, 1020. As shown in FIG. 10A, the lower end 1024 of the elevation actuator 1022 is located below the lower end 1044 of the pivoting links 1038, 1040, which are themselves located below the lower ends 1032 of the pivoting leg members 1018, 1020. The upper end 1026 of the elevation actuator 1022 is connected to the transverse elevation member 1028 below the upper end 1030 of the pivoting leg members 1018, 1020, and the upper end 1048 of the pivoting links 1038, 1040 is connected to the pivoting leg members 1018, 1020 below the upper end 1026 of the elevation actuator 1022.

When the elevation actuator 1022 is extended, its upper end 1026 moves away from its lower end 1024, thereby pushing against the transverse elevation member 1028 and the pivoting leg members 1018, 1020. Since the pivoting links 1038, 1040 are connected to the pivoting leg members 1018, 1020 below the transverse elevation member 1028, the pivoting links 1038, 1040 cause the pivoting leg members 1018, 1020 to pivot. More specifically, the upper end 1048 of the pivoting links 1038, 1040 defines a pivot point around which the pivoting leg members 1018, 1020 pivots as the elevation actuator 1022 extends. As the pivoting leg members 1018, 1020 pivot, their lower end 1032 move towards the elevation actuator 1022 and their upper end 1030 moves upwardly, thereby moving the frame 200 near the foot end 104 of the bed 100 upwardly and vertically. If only a single one of the head and foot elevation assemblies 1014, 1016 is actuated, the frame 200 is tilted towards the other one of the head and foot elevation assembly 1014, 1016. For example, if only the foot elevation assemblies 1016 is raised, as shown in FIGS. 10 to 10B, the frame 200 will tilt towards the head end 102 of the bed 100. If the elevation actuators 1022 of both the head and foot elevation assemblies 1014, 1016 are extended or retracted at the same speed and at the same length, then the frame 200 will be raised or lowered relative to the base 106.

In one embodiment, the control interface is operatively connected to the elevation actuator 1022 of the foot elevation assembly 1016 and of the head elevation assembly 1016 and is configured to allow the user to selectively raise, lower and tilt the frame 200 relative to the base 106 by entering a command into the control interface.

Figure 10:
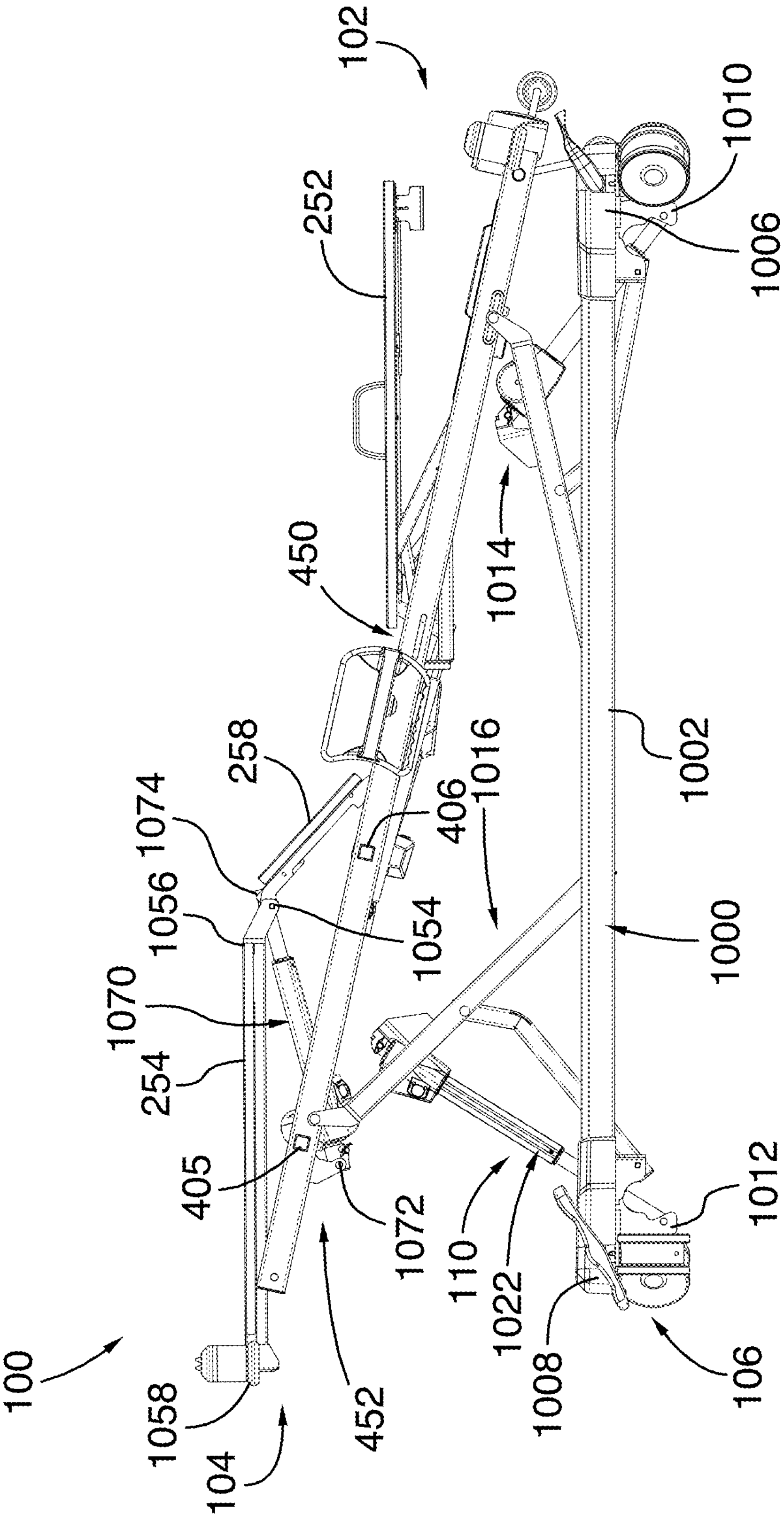
FIG. 10 is a side elevation view of the hospital bed illustrated in FIG. 1, with the barrier system removed and with the frame tilted and the backrest, the lower support panel and the core support panel oriented such that the bed is in a vascular configuration.
Figure 10A:
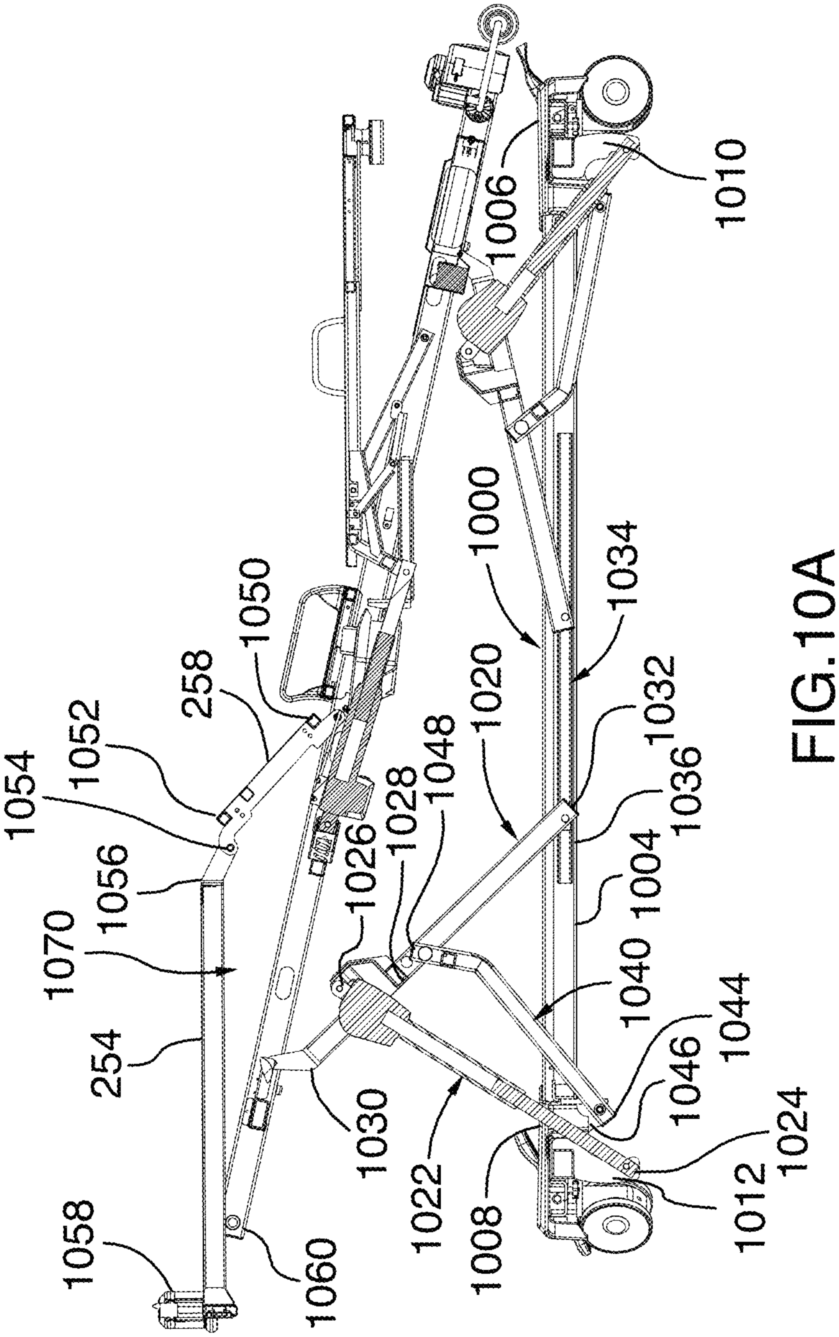
FIG. 10A is a cross-sectional view of the hospital bed illustrated in FIG. 1, taken along a longitudinal axis of the bed, with the barrier system removed and with the frame tilted and the backrest, the lower body support panel and the core support panel oriented such that the bed is in a vascular configuration.
Figure 10B:
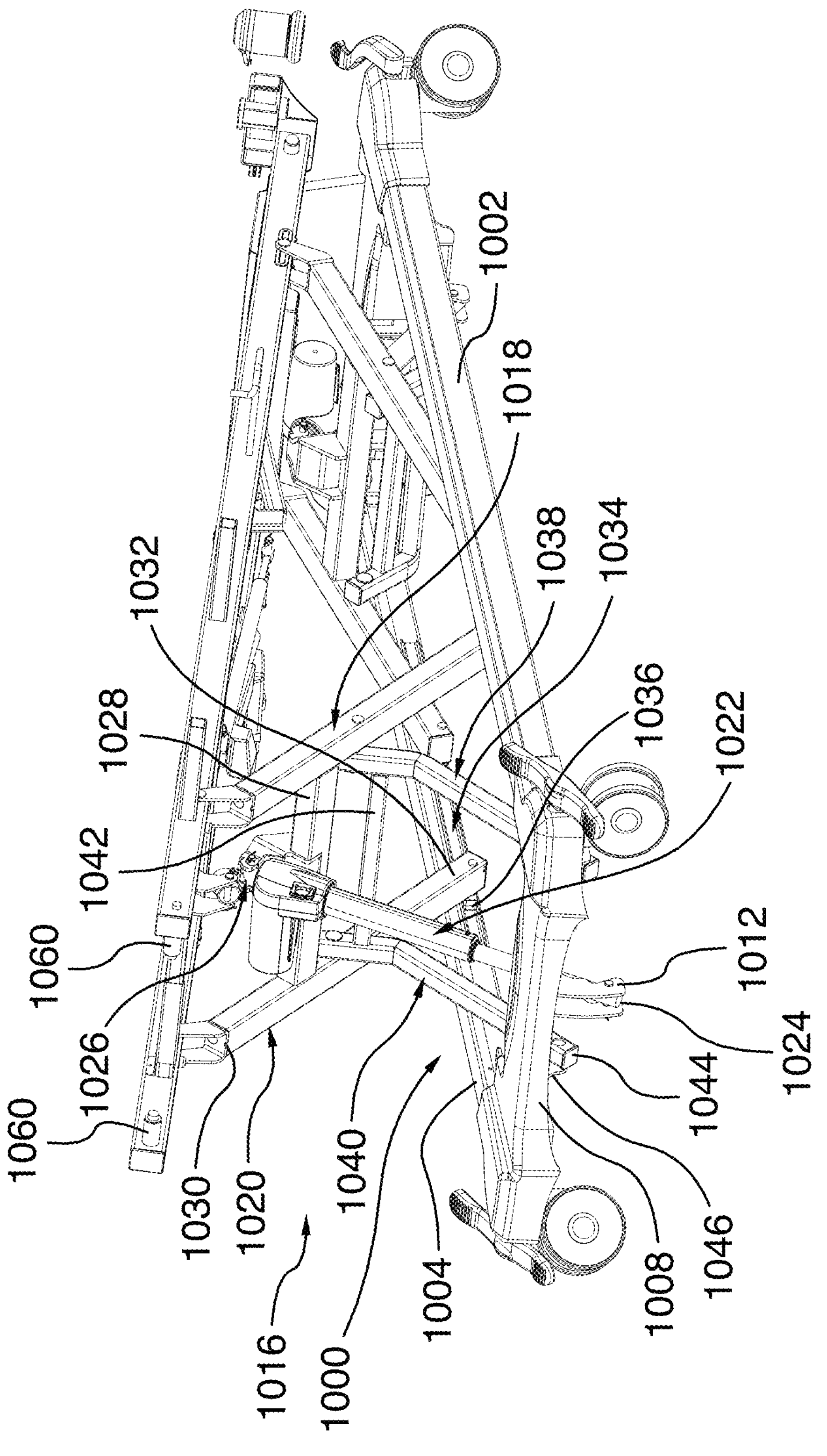
FIG. 10B is a partial, top rear perspective view of the hospital bed illustrated in FIG. 10, with the patient support surface removed to show details of the foot elevation assembly.

Still referring to FIGS. 10 to 10B, the foot pivoting system 452 is used to simultaneously pivot both the lower body support panel 254 and the core support panel 258 adjacent the lower body support panel 254. In the illustrated embodiment, the core support panel 258 has a front end 1050 hingeably connected to the adjacent core support panel 256 and a rear end 1052 hingeably connected to the lower body support panel 254 via a hinge connection 1054. The lower body support panel 254 has a front end 1056 hingeably connected to the core support panel 256 and a rear end 1058 which hangs off freely from the foot end 104 of the bed 100. Specifically, the lower body support panel 254 rests on a pair of rollers 1060 (best shown in FIG. 10B) rotatably connected to the left and right frame members 402, 404. This allow the lower body support panel 254 to be rolled on the rollers 1060 towards the core support panel 258 when the core support panel 258 is pivoted upwardly, as will be explained below. Alternatively, instead of rollers, one or more sliding surfaces may be provided to allow the lower body support panel 254 to slide towards the core support panel 258 when the core support panel 258 is pivoted upwardly. In yet another embodiment, the rear end 1058 of the lower body support panel 254 may instead comprise guide members which engage corresponding tracks provided on the left and right frame members 402, 404.

The foot pivoting system 452 comprises a lower body actuator 1070 (best shown in FIG. 10) having a rear end 1072 pivotably connected to the lower body transverse member 405 of the frame 200 and a front end 1074 pivotably connected to the hinge connection 1054 between the core support panel 258 and the lower body support panel 254. In an initial, non-pivoted position, the lower body support panel 254 and the core support panel 258 both lay flat on the frame 200. When the lower body actuator 1070 is extended from this position, the lower body actuator 1070 pushes against the hinge connection 1054, which causes the core support panel 258 to pivot about its front end 1050 such that its rear end 1052 is raised above the frame 200. The pivoting of the core support panel 258 also causes its rear end 1052 to move forward towards the head end 102 of the bed 100. Since the front end 1056 of the lower body support panel 254 is connected to the rear end 1052 of the core support panel 258, the front end 1056 of the lower body support panel 254 is also raised and moved forward towards the head end 102 of the bed 100. The lower body support panel 254 is therefore pulled forward towards the head end 102 of the bed 100 while its rear end 1058 still rests on the rollers 1060. In this position, the lower body support panel 254 is therefore angled relative to the core support panel 258, as shown in FIGS. 10 and 10A.

It will be appreciated that the foot pivoting system 452 described above is only provided as an example, and that the foot pivoting system 452 could be configured differently. For example, instead of a single foot pivoting system pivoting both the lower body support panel 254 and the core support panel 258 simultaneously, the bed 100 could comprise a first pivoting system for pivoting the lower body support panel 254 and a second, distinct pivoting system for pivoting one or more of the core support panels. Various alternative configurations known to a skilled addressee may also be used.

In the illustrated embodiment, the bed 100 is also adapted to be configured in a vascular configuration via a command provided on the control interface. The command could be the pressing of a dedicated button on the control interface, for example. This command triggers the appropriate displacement of the support panels and the frame 200 to achieve the vascular configuration, which is shown in FIG. 10. This allows the patient to be placed in the vascular position, in which the legs of the patient are horizontally aligned and are vertically higher than his heart. To achieve this configuration, the lower body support panel 254 and the core support panel 258 are raised with respect to the frame 200 by the foot pivoting system 452, and the backrest 252 is rotated away from the frame 200 by the backrest pivoting system 450. The frame 200 is tilted by lowering the head elevation assembly 1014, by raising the foot elevation assembly 1016 or by a combination of both such that the head end 102 of the bed 100 is lowered. In one embodiment, the bed 100 is adapted to carry out all of these displacements simultaneously and at specific speeds such that the lower body support panel 254 can be kept parallel to the ground (i.e. horizontal) at all times. Alternatively, the displacements described above could be carried out sequentially (i.e. one after the other).

In one embodiment, the control interface will first sense a current or initial configuration of the bed 100, and select an appropriate combination of operations to be performed to achieve the vascular configuration depending on the current configuration of the bed 100. Once the appropriate combination of operations is selected, the selected combination of operations are performed in sequence or simultaneously, as will be described below. The selected combination is therefore preprogrammed and no further input is needed from the user or from any sensor until the bed 100 reaches the vascular position. This allow the bed 100 to reach the vascular position rapidly and reliably.

Alternatively, the control interface may not sense an initial configuration of the bed 100. In this embodiment, the bed 100 may only be placed in the vascular position from one or more predetermined starting position.

The operations to be performed for placing the bed 100 in the vascular configuration from an initial configuration in which all of the support panels are horizontal and the frame 200 is fully raised (i.e. when the elevation actuators 1022 of the head and foot elevation assemblies 1014, 1016 are fully extended) will now be described in accordance with one embodiment.

A command to place the bed in the vascular position is first received. The core support panel 258 is pivoted. Specifically, the lower body actuator 1070 is extended, which pushes against the hinge connection 1054, as described above. This raises the rear end 1052 of the core support panel 258 to be raised above the frame 200, and causes the core support panel 258 to be oriented at a core angle above the frame 200. The core support panel 258 is pivoted until it reaches a core angle of 30 degrees with respect to the frame 200. As explained above, the pivoting of the core body surface 206 causes pivoting of the lower body support panel 254. In one embodiment, the pivoting of the core support panel 258 to a core angle of 30 degrees causes the lower body support panel 254 to be oriented at a lower body angle of 13 degrees relative to the frame 200. The backrest 252 is also pivoted upwardly until it reaches a backrest angle of 13 degrees with the frame 200. The frame 200 is further tilted at a tilt angle relative to the horizontal such that the head end 102 of the bed 100 is located below the horizontal. In one embodiment, the tilted angle is selected such that it is within a predetermined range of the lower body angle. In the illustrated embodiment, the frame 200 is tilted by lowering the head elevation assembly 1014 to lower the head end 102 of the bed 100 by an angle of 13 degrees below the horizontal, thereby placing the bed 100 in the vascular position. As explained above, all of these displacements can be done in sequence as presented above or, in one embodiment, simultaneously.

The operations to be performed for placing the bed 100 in the vascular configuration from an initial configuration in which all of the support panels are horizontal and the frame 200 is fully lowered (i.e. when the elevation actuators 1022 of the head and foot elevation assemblies 1014, 1016 are fully retracted) will now be described in accordance with one embodiment. The core body surface 206 is pivoted upwardly until it reaches an angle of 30 degrees with respect to the frame 200. The backrest 252 is also pivoted until it reaches an angle of 13 degree with the frame 200. Both the head elevation assembly 1014 and the foot elevation assembly 1016 are also used to fully raise the frame 200. The head elevation assembly 1014 is then lowered to tilt the frame 200 in order to lower the head end 102 of the bed 100 until it reaches an angle of 13 degrees below the horizontal. As explained above, all of these displacements can be done in sequence as presented above or, in one embodiment, simultaneously.

From the vascular configuration, the head elevation assembly 1014 and the foot elevation assembly 1016 may be used to tilt the frame 200 until it is horizontal. Then, the core support panel 258 and the backrest 252 are pivoted back downwardly until they abut the frame 200. In one embodiment, the control interface is further configured to then fully lower the frame 200 towards the base 106. This lowering of the frame 200 could be stopped by a command from the user.

It will be appreciated that other combinations of movements can be selected depending on the initial configuration of the bed 100.

In one embodiment, the lower body support panel 254 and/or the core support panel 258 adjacent the lower body support panel 254 are also configured to pivot downwardly towards a horizontal position when at least one of the CPR handle assemblies 460 is in the unlocked position and the backrest 252 is pivoted downwardly. It will be appreciated that pivoting all support panels downwardly such that the entire patient support surface 250 is horizontal and abuts the frame 200 may further allow medical personnel to provide suitable emergency care to the patient lying in the bed 100 in an emergency situation.

In this embodiment, the foot pivoting system 452 comprises a control unit (not shown) for determining whether the CPR handle assembly 460 is in the unlocked position. Alternatively, the control unit could be part of the control interface, which could be mounted on the bed 100 or be remote from the bed 100 as explained above, and be operatively connected to the foot pivoting system 452.

In one embodiment, the control unit determines if the CPR handle assembly 460 is in the unlocked position by determining a pivoting speed of the backrest 200. As explained above, when the CPR handle assemblies 460 are in the unlocked position, the first and second actuator portions 552, 554 of the backrest actuator 514 are uncoupled and the backrest 252 is pivoted down under the weight of the backrest 252 and/or of the patient lying on the bed 100. It will be understood that this pivoting of the backrest 252 using the CPR handle assemblies 460 is used in emergency situations when it may be necessary to place the patient in a predetermined CPR position relatively quickly. The pivoting of the backrest 252 when the CPR handle assembly 460 is in the unlocked position is therefore performed at a speed which is substantially higher than the speed at which the backrest 252 is pivoted by retracting the backrest actuator 514 for a simple adjustment of the orientation of the backrest 252. If the determined pivoting speed is above a threshold speed value, the control unit therefore determines that the CPR handle assembly 460 is in the unlocked position.

To determine the pivoting speed of the backrest 252, the orientation sensor 600 may be used. More specifically, the control unit may be operatively connected to the orientation sensor 600 and may be configured to receive from the orientation sensor 600 a signal indicative of the orientation of the backrest 252 at a predetermined frequency. For example, the foot pivoting system 452 could receive a signal indicative of an orientation angle of the backrest 252 relative to the frame 200 every 100 millisecond. Alternatively, the foot pivoting system 452 could receive a signal from the orientation sensor 600 at another frequency. In one embodiment, the threshold speed value above which the control unit determines that the CPR handle assembly 460 is in the unlocked position is 8 degrees per second. Alternatively, the threshold speed value could be different.

In one embodiment, the control unit is further adapted to detect a pivoting direction of the backrest 252. In the example above in which the control unit is operatively connected to the orientation sensor 600, the control unit is configured to compare a set of consecutive signals received from the orientation sensor 600. If the signals from the set of signals are indicative of decreasing orientation angles of the backrest relative 252 to the frame 200, then the control unit determines that the backrest 252 is being pivoted downwardly.

In one embodiment, the control unit is configured to compare every ten consecutive signals indicative of the orientation of the backrest. In an embodiment in which the signal indicative of the orientation of the backrest 252 are received by the control unit every 100 milliseconds, the orientation of the backrest 252 would therefore be monitored over a period of time of one second.

Alternatively, instead of being operatively connected to the orientation sensor 600, the control unit could be operatively connected to another, distinct orientation sensor coupled to the backrest 252 for determining an orientation of the backrest 252. In another embodiment, the control unit could be operatively connected to a speed sensor such as an accelerometer-based speed sensor or the like.

In another embodiment, the control unit could instead be operatively connected to a CPR handle sensor (not shown) to determine whether the CPR handle assembly is in the locked position or the unlocked position. For example, the CPR sensor could be operatively connected to the handle member 464 of the CPR handle assemblies 460 and could be adapted to determine whether the handle member 464 is angled by an angle of more than a threshold angle value, which would be indicative that the handle member 464 has been pulled and that the CPR handle assembly 460 is in the unlocked position.

The control unit is further operatively connected to the lower body actuator 1070 for actuating the lower body actuator 1070 upon a determination that the speed of pivoting of the backrest 252 is above the threshold speed value and that the backrest 252 is being pivoted downwardly towards the frame 200. More specifically, the actuator is retracted to pivot the lower body panel 254 and the core body panel 258 downwardly towards the frame, as explained above.

In one embodiment, when at least one of the CPR handle assemblies 460 is in the unlocked position and the backrest 252 is being pivoted downwardly, the lower body support panel 254 and the core support panel 258 are pivoted downwardly until they abut the frame 200.

In one embodiment, the actuation of the lower body actuator 1070, and therefore the pivoting of the lower body support panel 254 and the core support panel 258 could be stopped before they abut the frame 200 upon a detection of one or more stop triggers by the control unit. For example, the stop triggers may include a detection that the pivoting of the backrest 252 has stopped before the backrest 252 has reached an angle of 5 degrees or less relative to the frame 200, which may mean that the user no longer wants to place the support panels 252, 252, 258 in a horizontal position for emergency care. This may be useful to prevent the lower body support panel 254 and the core support panel 258 from fully pivoting in a horizontal position if one of the CPR handle assemblies 460 was unlocked inadvertently. In one embodiment, if the backrest 252 is at an angle of less than 5 degrees relative to the frame 200 when the CPR handle assemblies 460 is move from an unlocked position to a locked position, the pivoting of the lower body support panel 254 and the core support panel 258 could still continue until the pivoting of the lower body support panel 254 and the core support panel 258 abut the frame 200. The stop triggers may further include a detection that a command has been provided on the control interface, for example if a button is pressed on the control interface. The stop triggers may further include a loss of power to the control unit, a malfunction of the orientation sensor 600 or any other event where the skilled addressee may consider that stopping the pivoting of the lower body support panel 254 and the core support panel 258 towards a horizontal position may be desirable.

Alternatively, instead of being retracted, the lower body actuator 1070 could be de-coupled similarly to the backrest actuator 514, as described above. In this case, the lower body actuator 1070 could also be mounted in series with a resilient member similar to the helical spring 650 mounted in series with the backrest actuator 514 in order to reduce the impact of the re-coupling of the lower body actuator 1070, as described above.

Figure 11:
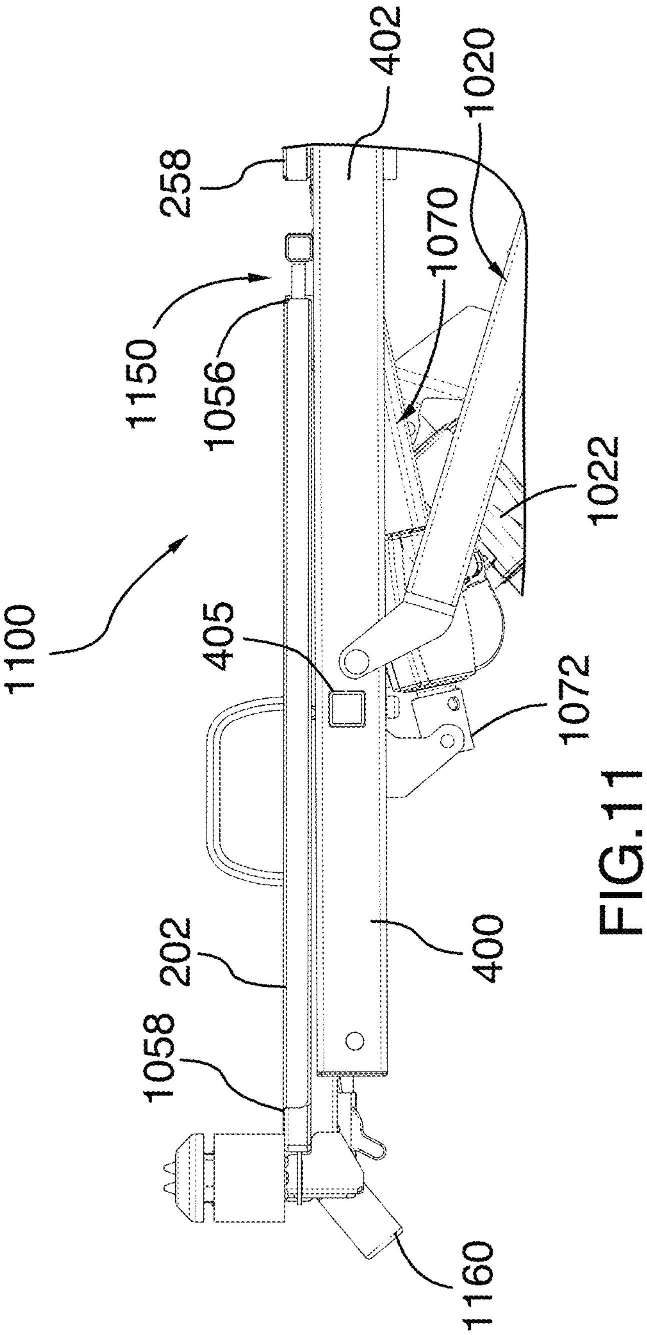
FIG. 11 is an enlarged, partial side elevation view of the hospital bed illustrated in FIG. 1, showing the lower body support panel in a retracted configuration.
Figure 12:
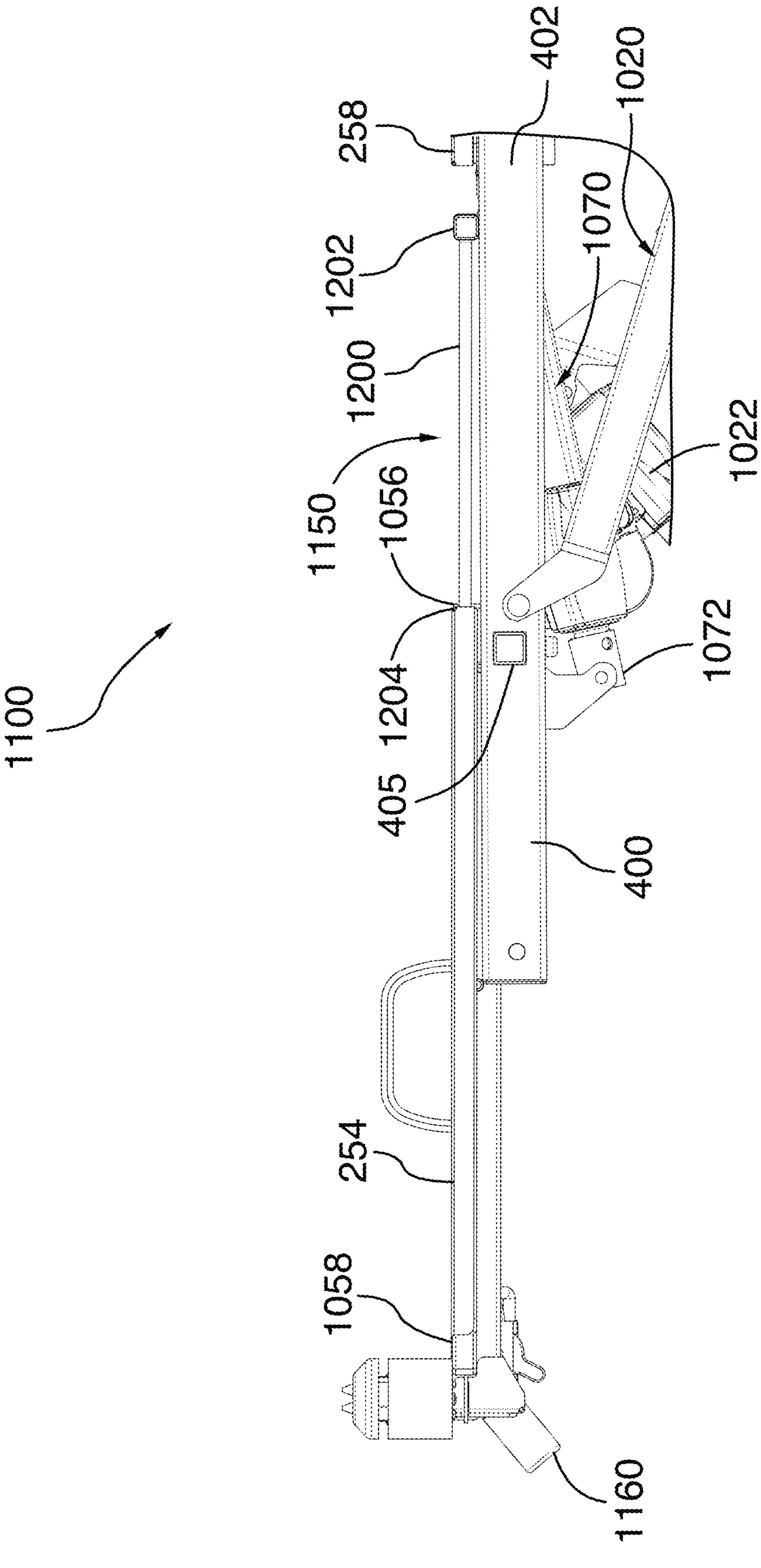
FIG. 12 is an enlarged, partial side elevation view of the hospital bed illustrated in FIG. 1, showing the lower body support panel in an extended configuration.

Now referring to FIGS. 11 and 12, the bed 100 may also comprise an extendable user support assembly 1100 which allows the lower body support panel 254 to be moved longitudinally away from the core support panel 258 adjacent the lower body support panel 254 in order for the length of the bed 100 to be extended. In the illustrated embodiment, the extendable user support assembly 1100 includes an extension member 1200 which has a first end 1202 pivotably connected to the core support panel 258 and a second end 1204 which telescopically engages the lower body support panel 254. In one embodiment, the extension member 1200 could comprise a pair of spaced-apart rigid rods extending longitudinally relative to the bed 100. The lower body support panel 254 includes a pair of longitudinal bores sized and shaped for receiving the rigid rods. In this configuration, the rigid rods slide within the longitudinal bores when the lower body support panel 254 is pulled away from the core support panel 258. It will be appreciated that various alternative configurations may be possible for the extension member 1200.

It will also be appreciated that the extension member 1200 allows the lower body support panel 254 to remain connected to the bed 100 as it is pulled away. Specifically, the extension member 1200 only allows longitudinal movement of the lower body support panel 254 such that the lower body support panel 254 is still able to pivot when the foot pivoting system 452 is actuated as explained above.

When the extendable user support assembly 1100 is extended, as shown in FIG. 12, the extension member 1200 is generally in the same plane as the lower body support panel 254. The extension member 1200 will therefore receive part of the mattress (not shown) placed on the bed 100. The extension member 1200 is therefore sized and shaped to support at least part of the weight of the mattress provided on the bed 100 and of the patient's weight.

It will further be understood that as the lower body support panel 254 is moved away from the core support panel 258, an opening 1150 is formed between the lower body support panel 254 and the core support panel 258. It will be appreciated that this opening 1150 does not cause discomfort to patient since the mattress (not shown), which is typically relatively rigid, spans over it.

In the illustrated embodiment, the extendable user support assembly 1100 can be moved manually using a handle 1160 which extends rearwardly and downwardly from the rear end 1058 of the lower body support panel 254. A user pulls on the handle 1160 to move the lower body support panel 254 away from the core support panel 258 and pushes the handle 1160 to move the lower body support panel 254 towards the core support panel 258 and the head end 102 of the bed 100. Alternatively, the lower body support panel 254 may be operatively connected to an extension actuator which could be controlled by the control interface to allow the lower body support panel 254 to be moved longitudinally relative to the bed 100 using the actuator instead of using the handle 1160.

In the illustrated embodiment, the lower body support panel 254 can be moved continuously between a retracted position shown in FIG. 11, in which the lower body support panel 254 is substantially adjacent the core support panel 258, and a fully extended position shown in FIG. 12, in which the lower body support panel 254 is prevented from extending further away from the core support panel 258. In one embodiment, the lower body support panel 254 is further adapted to be easily placed into one or more predetermined intermediate positions between the retracted position and the fully extended position. For example, the extension member 1200 could comprise a notch at a predetermined position along its length which could be sensed by the user as the user pulls or pushes the lower body support panel 254. Alternatively, the extension member 1200 could comprise a visual marker to indicate the intermediate position.

In the illustrated embodiment, when the retracted position, the lower body support panel 254 is still slightly spaced from the first end 1202 of the extension member 1200. Specifically, the lower body support panel 254 is spaced from the first end 1202 of the extension member 1200 by 1 inch. In this configuration, the bed 100 may be adapted to receive a mattress having a length of 80 inches. Still in the illustrated embodiment, when in the fully extended position, the lower body support panel 254 is spaced from the first end 1202 of the extension member 1200 by 11 inches. In this configuration, the bed 100 may be adapted to receive a mattress having a length of 90 inches or, alternatively, a mattress having a length of 84 inches and a bolster pad having a length of 6 inches. In one embodiment, the extendable user support assembly 1100 could also be placed in an intermediate position in which the lower body support panel 254 is spaced from the first end 1202 of the extension member 1200 by 5 inches. In this configuration, the bed 100 may be adapted to receive a mattress having a length of 84 inches.

It will be appreciated that, in addition to the features described above, all hinges and mechanical components of the bed 100 are hidden under the patient support surface 250 to provide as little discontinuities as possible on the patient support surface 250. This facilitates the cleaning of the bed 100 and its components.

It will also be appreciated that while a hospital bed is used to illustrate the examples described herein, other patient support devices, such as stretchers, adjustable chairs, home-care beds, etc., are also suitable for use with the described systems. Moreover, the term "patient" is not intended to be limiting, and can be taken to apply to any user of the support device, such as an individual undergoing short-term, medium-term or long-term care, a hospital patient, a nursing home resident, etc.

The embodiments described above are intended to be exemplary only. The scope of the invention is therefore intended to be limited solely by the appended claims.

The invention claimed is:

1. A bed for a patient, comprising:

a patient platform comprising a backrest for supporting a patient's head and a patient's back region, a core body panel for supporting at least partially a patient's hip region and patient's legs, and a lower body panel for supporting the patient's legs;

a frame, the patient platform being mounted to the frame;

a base frame, the frame being mounted to the base frame;

a backrest actuator for pivoting the backrest relative to the frame;

an orientation sensor for determining an orientation of the backrest relative to the frame;

a control unit connected to the orientation sensor for determining a pivoting speed of the backrest based on the orientation of the backrest; and a lower body actuator for pivoting the lower body panel or the core body panel relative to the frame, wherein, upon a determination that the pivoting speed of the backrest is above a threshold speed value and that the backrest is pivotable towards the frame, the control unit actuates the lower body actuator.

2. The bed of claim 1, wherein the backrest actuator comprises a first actuator portion mounted to the frame and a second actuator portion mounted to the backrest.

3. The bed of claim 2, comprising a release that is movable between a locked position, wherein the first actuator portion is coupled to the second actuator portion, and an unlocked position, wherein the second actuator portion is decoupled from the first actuator portion to allow free pivoting of the backrest towards the frame.

4. The bed of claim 3, wherein the backrest actuator comprises a transmission operatively coupling the second actuator portion to the first actuator portion and wherein the release is operatively connected to the transmission.

5. The bed of claim 3, wherein, when the release is in the unlocked position, the control unit actuates the lower body actuator.

6. The bed of claim 1, wherein the lower body panel and the core body panel pivot relative to each other.

7. The bed of claim 1, wherein the core body panel comprises first and second panels, the first panel for supporting at least partially the patient's hip region and the second panel for supporting at least partially the patient's hip region and the legs.

8. The bed of claim 1, wherein the threshold speed value is 8 degrees per second.

9. The bed of claim 1, wherein the control unit is adapted to receive from the orientation sensor a signal providing the orientation of the backrest at a predetermined frequency.

10. The bed of claim 1, wherein the core body panel comprises first and second panels, the first panel for supporting at least partially the patient's hip region and the second panel for supporting at least partially the patient's hip region and the legs, wherein the second panel comprises upper and lower ends, wherein the lower body panel comprises upper and lower ends, wherein the lower end of the second panel is pivotably connected to the upper end of the lower body panel at a hinge connection, and wherein the lower body actuator comprises a lower end pivotably mounted at a lower body transverse member of the frame and an upper end pivotably connected to the hinge connection.

11. The bed of claim 1, wherein the orientation sensor comprises a potentiometer and a sensor arm operatively connected to the potentiometer and pivotably connected to the backrest for determining the orientation of the backrest relative to the frame.

12. The bed of claim 11, wherein the sensor arm is a first sensor arm pivotably connected to the backrest and wherein the orientation sensor comprises a second sensor arm operatively connecting the potentiometer to the first sensor arm.

13. A bed for a patient, comprising:

a patient platform comprising a backrest for supporting a patient's head and a patient's back region, a core body panel for supporting at least partially a patient's hip region and patient's legs, and a lower body panel for supporting the patient's legs;

a frame, the patient platform being mounted to the frame;

a base frame, the frame being mounted to the base frame;

a backrest actuator comprising a first actuator portion mounted to the frame and a second actuator portion mounted to the backrest for pivoting the backrest relative to the frame;

a release that is movable between a locked position, wherein the first actuator portion is coupled to the second actuator portion, and an unlocked position, wherein the second actuator portion is decoupled from the first actuator portion to allow free pivoting of the backrest towards the frame;

an orientation sensor for determining an orientation of the backrest relative to the frame;

a control unit connected to the orientation sensor for determining a pivoting speed of the backrest based on the orientation of the backrest; and a lower body actuator for pivoting the lower body panel or the core body panel relative to the frame, wherein, when the release is in the unlocked position, and upon a determination that the pivoting speed of the backrest is above a threshold speed value, the control unit actuates the lower body actuator.

14. The bed of claim 13, wherein the backrest actuator comprises a transmission operatively coupling the second actuator portion to the first actuator portion and wherein the release is operatively connected to the transmission.

15. The bed of claim 13, wherein the lower body panel and the core body panel pivot relative to each other.

16. The bed of claim 13, wherein the core body panel comprises first and second panels, the first panel for supporting at least partially the patient's hip region and the second panel for supporting at least partially the patient's hip region and the legs, wherein the second panel comprises upper and lower ends, wherein the lower body panel comprises upper and lower ends, wherein the lower end of the second panel is pivotably connected to the upper end of the lower body panel at a hinge connection, and wherein the lower body actuator comprises a lower end pivotably mounted at a lower body transverse member of the frame and an upper end pivotably connected to the hinge connection.

17. The bed of claim 13, wherein the control unit is adapted to receive from the orientation sensor a signal providing the orientation of the backrest at a predetermined frequency.

18. The bed of claim 17, wherein the predetermined frequency is every 100 milliseconds.

19. The bed of claim 13, wherein the orientation sensor comprises a potentiometer and a sensor arm operatively connected to the potentiometer and pivotably connected to the backrest for determining the orientation of the backrest relative to the frame.

20. The bed of claim 19, wherein the sensor arm is a first sensor arm pivotably connected to the backrest and wherein the orientation sensor comprises a second sensor arm operatively connecting the potentiometer to the first sensor arm.

21. A bed for a patient, comprising:

a patient platform comprising a backrest for supporting a patient's head and a patient's back region, a core body panel comprising first and second panels, the first panel being for supporting at least partially a patient's hip region and the second panel being for supporting at least partially the patient's hip region and patient's legs, the second panel comprising upper and lower ends, and a lower body panel for supporting the patient's legs, the lower body panel comprising upper and lower ends, wherein the lower end of the second panel is pivotably connected to the upper end of the lower body panel at a hinge connection;

a frame, the patient platform being mounted to the frame;

a base frame, the frame being mounted to the base frame;

a backrest actuator for pivoting the backrest relative to the frame;

a release that is movable between a locked position and an unlocked position;

an orientation sensor for determining an orientation of the backrest relative to the frame;

a control unit connected to the orientation sensor for determining a pivoting speed of the backrest based on the orientation of the backrest; and a lower body actuator for pivoting the lower body panel or the second panel relative to each other, wherein the lower body actuator comprises a lower end pivotably mounted at a lower body transverse member of the frame and an upper end pivotably connected to the hinge connection, wherein, when the release is in the unlocked position and upon a determination that the pivoting speed of the backrest is above a threshold speed value, the control unit actuates the lower body actuator.

22. The bed of claim 21, wherein the control unit is adapted to receive from the orientation sensor a signal providing the orientation of the backrest at a predetermined frequency.

23. The bed of claim 21, wherein the backrest actuator comprises a first actuator portion mounted to the frame and a second actuator portion mounted to the backrest, and wherein, in the locked position, the first actuator portion is coupled to the second actuator portion, and in the unlocked position, the second actuator portion is decoupled from the first actuator portion to allow free pivoting of the backrest towards the frame.

24. The bed of claim 23, wherein the backrest actuator comprises a transmission operatively coupling the second actuator portion to the first actuator portion and wherein the release is operatively connected to the transmission.

25. The bed of claim 21, wherein the orientation sensor comprise a potentiometer and a sensor arm operatively connected to the potentiometer and pivotably connected to the backrest.

* * * * *